(12) United States Patent
Kawakami

(10) Patent No.: US 7,606,238 B2
(45) Date of Patent: Oct. 20, 2009

(54) PACKET COMMUNICATION METHOD, CONTROLLER AND MOBILE STATION

(75) Inventor: Hiroshi Kawakami, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 394 days.

(21) Appl. No.: 10/560,170

(22) PCT Filed: Jun. 11, 2004

(86) PCT No.: PCT/JP2004/008199

§ 371 (c)(1),
(2), (4) Date: Dec. 9, 2005

(87) PCT Pub. No.: WO2004/112318

PCT Pub. Date: Dec. 23, 2004

(65) Prior Publication Data

US 2006/0133326 A1   Jun. 22, 2006

(30) Foreign Application Priority Data

Jun. 11, 2003 (JP) .............................. 2003-166293

(51) Int. Cl.
*H04L 12/56* (2006.01)

(52) U.S. Cl. .............................. 370/395.5; 370/395.52; 370/469

(58) Field of Classification Search ................ 370/349, 370/395.21, 474, 395.4, 395.52, 469; 455/442, 455/458

See application file for complete search history.

(56) References Cited

U.S. PATENT DOCUMENTS

| | | | | |
|---|---|---|---|---|
| 2003/0171118 | A1* | 9/2003 | Miya | 455/442 |
| 2003/0174689 | A1* | 9/2003 | Fujino | 370/349 |
| 2004/0018846 | A1* | 1/2004 | Cheng et al. | 455/458 |

FOREIGN PATENT DOCUMENTS

| | | |
|---|---|---|
| JP | 2000-32056 | 1/2000 |
| JP | 2001-358771 | 12/2001 |
| JP | 2002-531030 | 9/2002 |
| JP | 2003-69633 | 3/2003 |

OTHER PUBLICATIONS

ATM Forum Technical Committee, Traffic Management Specification version 4.1, p. 4 to 11, 1999.
Blakes S. et al., An Architecture for Differentiated Services, RFC 2475, IETF, 1998.
Braden R, et al, Integrated Services in the Internet Architecture: an Overview, RFC 1633, IETF, 1994.

* cited by examiner

*Primary Examiner*—Seema S Rao
*Assistant Examiner*—Wanda Z Russell
(74) *Attorney, Agent, or Firm*—Oblon, Spivak, McClelland, Maier & Neustadt, P.C.

(57) ABSTRACT

A packet communication method of the present invention includes establishing a radio layer 2 connection based on a radio layer 2 protocol between a mobile station and a controller device, determining a transmission timing of a received data packet based on a quality of service set in the data packet, and multiplexing, at the determined transmission timing, the data packet into a radio layer 2 protocol data unit of a fixed length which is transmitted and received on the radio layer 2 connection.

8 Claims, 18 Drawing Sheets

PACKET COMMUNICATION METHOD, CONTROLLER AND MOBILE STATION

TECHNICAL FIELD

The present invention relates to a packet communication method, a controller device, and a mobile station, for performing packet communication using radio access technology.

BACKGROUND ART

The Universal Mobile Telecommunication System (UMTS) standardized in the 3rd Generation Partnership Project (3GPP) has been known as a third-generation radio communication system for implementing packet communication using radio access technology.

FIG. 1 shows the configuration of a conventional radio communication system including a UMTS network. As shown in FIG. 1, base stations BS, a radio network controller RNC, a subscriber node SGSN (Serving GPRS Support Node), and a gateway node GGSN (Gateway GPRS Support Node) are disposed in the UMTS network. The UMTS network is connected to a packet communication network such as the Internet. Communication terminals TE such as personal computers (PC) can be connected to the UMTS network via mobile stations MS.

FIG. 2(a) shows a protocol stack in the conventional radio communication system. FIG. 2(b) shows the configuration of a Radio Link Control (RLC) connection and GPRS Tunneling Protocol (GTP) connections established in the conventional radio communication system.

As shown in FIG. 2(a), in the conventional radio communication system, an RLC connection based on the RLC protocol is established between the mobile station MS and the radio network controller RNC.

A GTP connection is established between the radio network controller RNC and the subscriber node SGSN. A GTP connection based on the GTP protocol is established between the subscriber node SGSN and the gateway node GGSN.

Here, in the radio network controller RNC, the RLC connection established with the mobile station MS is associated one-to-one with the GTP connection established with the subscriber node SGSN.

In the subscriber node SGSN, the GTP connection established with the radio network controller RNC is associated one-to-one with the GTP connection established with the gateway node GGSN.

Radio communication systems generally need to handle communications which require various qualities of service (QoS), from communications which require real time such as voice communications and video communications, to communications which permit some delay such as e-mails.

For this, it is known to perform QoS control in a transport technology such as the Asynchronous Transfer Mode (ATM) technology or the IP technology, so as to meet QoS requirements such as an allowable transmission delay and an allowable packet loss in each communication.

In the ATM technology, for example, various traffic management techniques are defined, so that functions of dealing with various QoS requirements, from guaranteed-bandwidth services to best-effort services, can be used. In the IP technology, QoS control functions such as Differentiated Services and Integrated Services can be used.

However, when a plurality of communications are multiplexed to an RLC connection as shown in FIG. 2(b), that is, when a plurality of data packets are multiplexed and loaded into RLC-PDUs (Protocol Data Units), the data packets are handled as having the same QoS requirement at an ATM connection (or at an IP tunneling connection, an MPLS connection or the like), and there occurs the problem that QoS control cannot be performed on each communication.

To solve this problem, it has been conceived that, as shown in FIG. 2(C), in the conventional radio communication system, the mobile station MS creates multiple "Packet Data Protocol (PDP) contexts" for data packets having different QoS requirements, according to communication destinations and the QoS requirements, and establishes multiple RLC connections for the created PDP contexts.

A PDP context is a collection of information set for the subscriber node SGSN, the gateway node GGSN and so on before communication. The PDP context includes communication status information, information on QoS requirements required in a communication, communication destination information and so on.

In the conventional radio communication system, the base station BS and the radio network controller RNC perform synchronous control at the start of communication, for determining a transmission timing of an MAC-PDU from the radio network controller RNC to the base station BS.

In a soft handover where a mobile station MS performs communications through different base stations BS at a time, the synchronous control allows the different base stations BS to transmit an MAC-PDU to the mobile station MS simultaneously using the W-CDMA technology.

Here, the timing for the base stations BS to transmit the MAC-PDU transmitted from the radio network controller RNC to the mobile station MS is determined in view of a transmission delay between the base stations BS and the radio network controller RNC, a wait time due to QoS control and so on.

The base stations BS are configured to refer to a sequence number given to a Frame Protocol (FP) frame transmitted from the radio network controller RNC, and transmit an MAC-PDU included in the FP frame of an appropriate sequence number at a transmission timing determined as described above.

However, the conventional radio communication system has the problem that a mobile station MS needs to establish a plurality of RLC connections for data packets with different QoS requirements even for communication with the same communication destination, and must have the capability of establishing a plurality of RLC connections.

Also, the conventional radio communication system has the problem that a mobile station MS must perform a path change for all established RLC connections and GTP connections at the same time, when changing a communication path due to a handover, which results in an increased control load and reduced performance.

Also, the conventional radio communication system has the problem that since a wait time for a low-priority MAC-PDU is set long in the base station BS, even when an FP frame including a low-priority MAC-PDU is transferred from the radio network controller RNC to the base station BS with a small delay, the base station BS must wait to transmit the MAC-PDU included in the FP frame until a determined timing.

The present invention has been made in view of the above problems, and has an object of providing a packet communication method, a controller device and a mobile station for being able to reduce the number of RLC connections to be established, to improve performance in radio communication systems.

DISCLOSURE OF THE INVENTION

A first aspect of the present invention is summarized as comprising the steps of establishing a radio layer 2 connection based on a radio layer 2 protocol, between a mobile station and a controller device; determining a transmission timing of a received data packet, based on a quality of service set in the data packet; and multiplexing, at the determined transmission timing, the data packet into a radio layer 2 protocol data unit of a fixed length which is transmitted and received on the radio layer 2 connection.

A second aspect of the present invention is summarized as a controller device comprising a radio layer 2 connection establishing unit configured to establish, with a mobile station, a radio layer 2 connection based on a radio layer 2 protocol; a transmission timing determining unit configured to determine a transmission timing of a received data packet, based on a quality of service set in the data packet; and a multiplexing unit configured to multiplex, at the determined transmission timing, the data packet into a radio layer 2 protocol data unit of a fixed length which is transmitted and received on the radio layer 2 connection.

The second aspect of the present invention may further comprise a transmitting unit configured to transmit, by a transport technology, the radio layer 2 protocol data unit into which the data packet is multiplexed.

A third aspect of the present invention is summarized as a mobile station comprising a radio layer 2 connection establishing unit configured to establish, with a controller device, a radio layer 2 connection based on a radio layer 2 protocol; a transmission timing determining unit configured to determine a transmission timing of a received data packet, based on a quality of service set in the data packet; and a multiplexing unit configured to multiplex, at the determined transmission timing, the data packet into a radio layer 2 protocol data unit of a fixed length which is transmitted and received on the radio layer 2 connection.

The third aspect of the present invention may further comprise a transmitting unit configured to transmit, by a radio access technology, the radio layer 2 protocol data unit into which the data packet is multiplexed.

A fourth aspect of the present invention is summarized as comprising the steps of, at a mobile station, establishing a radio layer 2 connection based on a radio layer 2 protocol; establishing a plurality of tunneling connections between two or more controller devices; and at a first controller device, referring to a terminal address included in a data packet which is multiplexed on the radio layer 2 connection and transmitted from the mobile station, and relaying the data packet through a tunneling connection associated with the terminal address.

In the fourth aspect of the present invention, the mobile station may transmit a communication start request; the first controller device may transmit a tunneling connection establishment request to a second controller device in accordance with the communication start request; the second controller device may establish a tunneling connection with the first controller device in accordance with the tunneling connection establishment request, and may associate the established tunneling connection with the terminal address; and the associated terminal address may be communicated to the mobile station.

A fifth aspect of the present invention is summarized as a controller device comprising a tunneling connection establishing unit configured to establish a plurality of tunneling connections with a certain controller device; an associating unit configured to associate a terminal address included in a data packet with a tunneling connection; a data packet receiving unit configured to receive a data packet which is multiplexed on a radio layer 2 connection and transmitted from a mobile station; and a relay unit configured to refer to a terminal address included in the received data packet and relay the data packet through a tunneling connection associated with the terminal address.

BEST MODE FOR CARRYING OUT THE INVENTION

First Embodiment

Hereinafter, a first embodiment of the present invention will be described in detail with reference to the drawings. This embodiment will be described with a focus on multiplexing a plurality of data packets in which different QoS requirements are set, on an RLC connection established between a mobile station MS and a radio network controller RNC.

Figure 1:
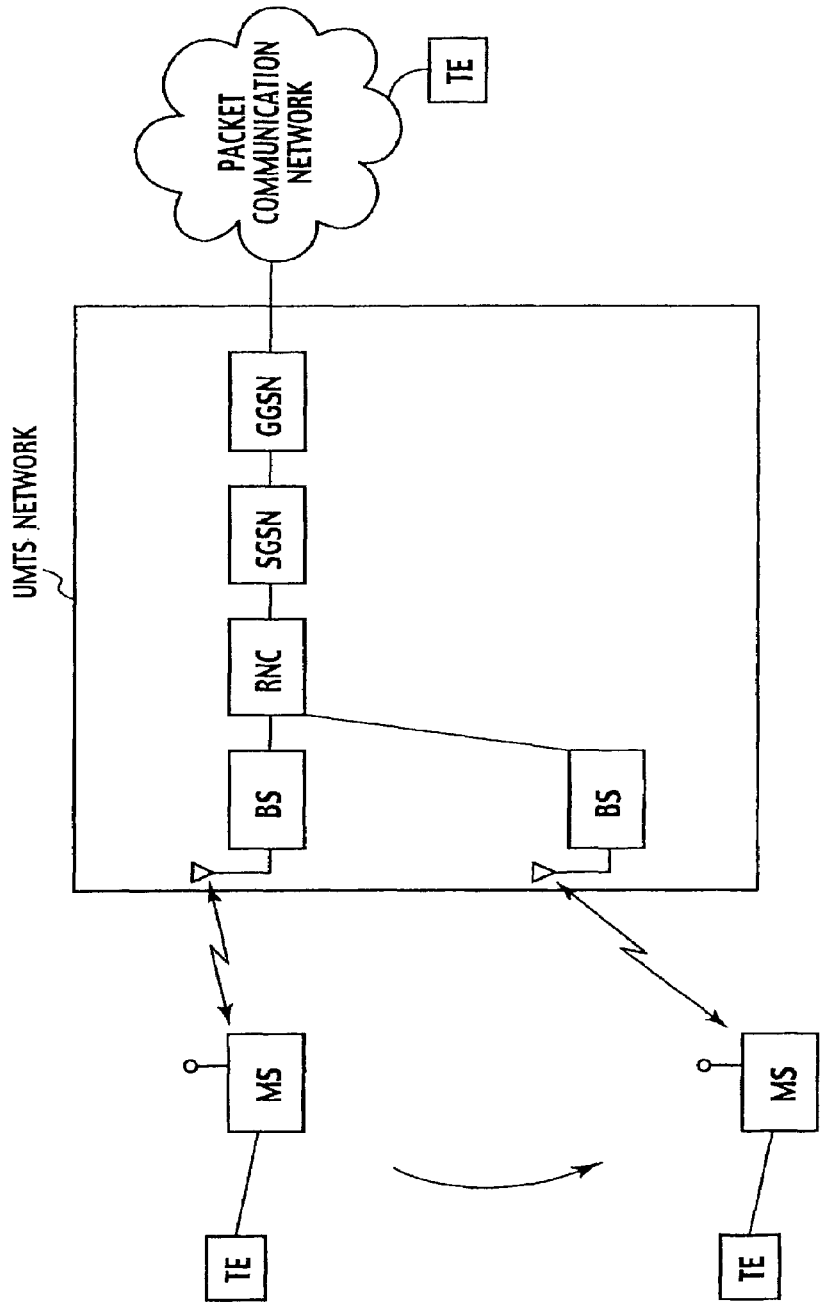
FIG. 1 is an entire structural diagram of a radio communication system for implementing a packet communication method according to a related art.
Figure 2:
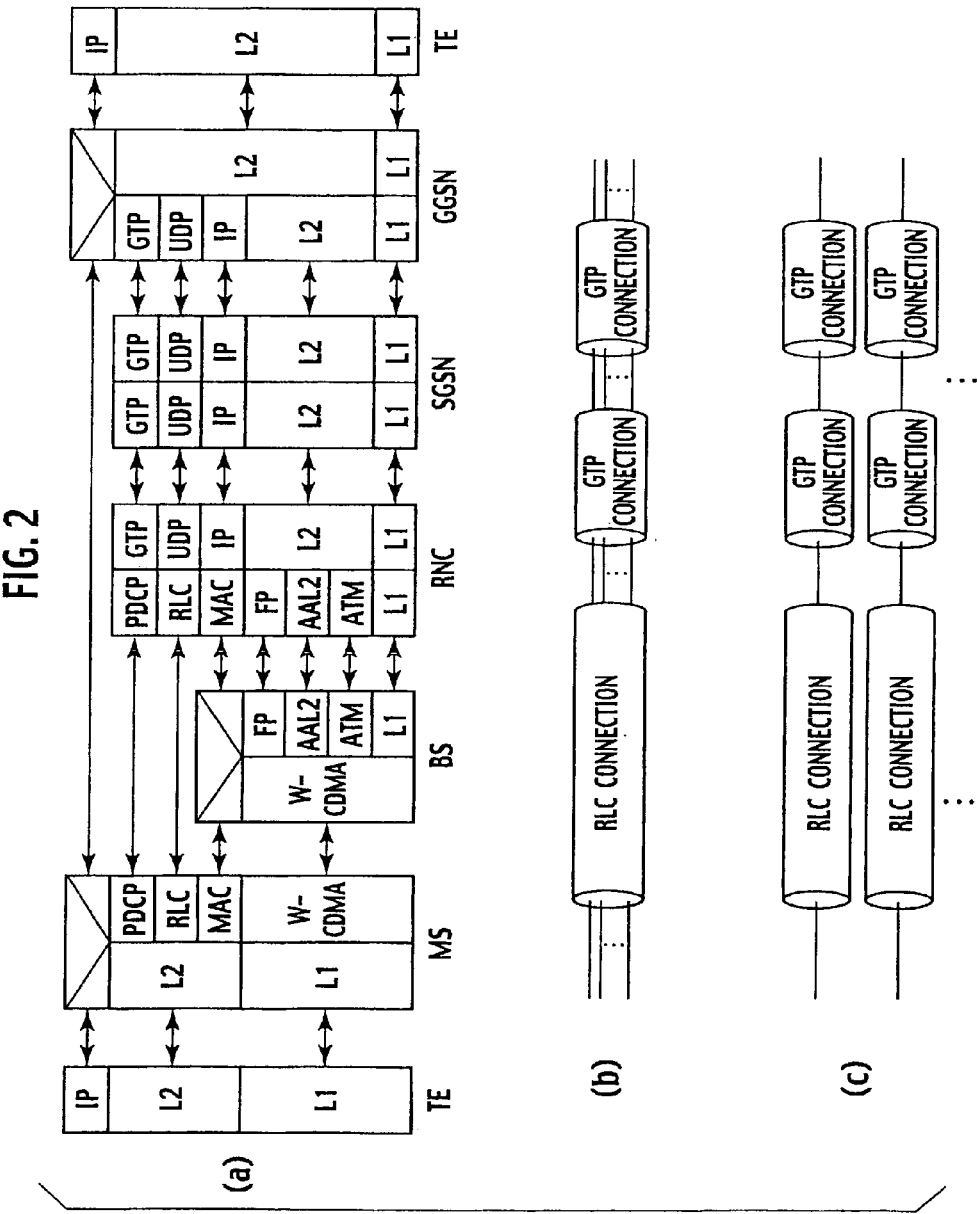
FIGS. 2(a) to 2(c) are diagrams showing an example of a protocol stack for implementing the packet communication method of the related art, and RLC connections and GTP connections established in the packet communication method of the related art.
Figure 3:
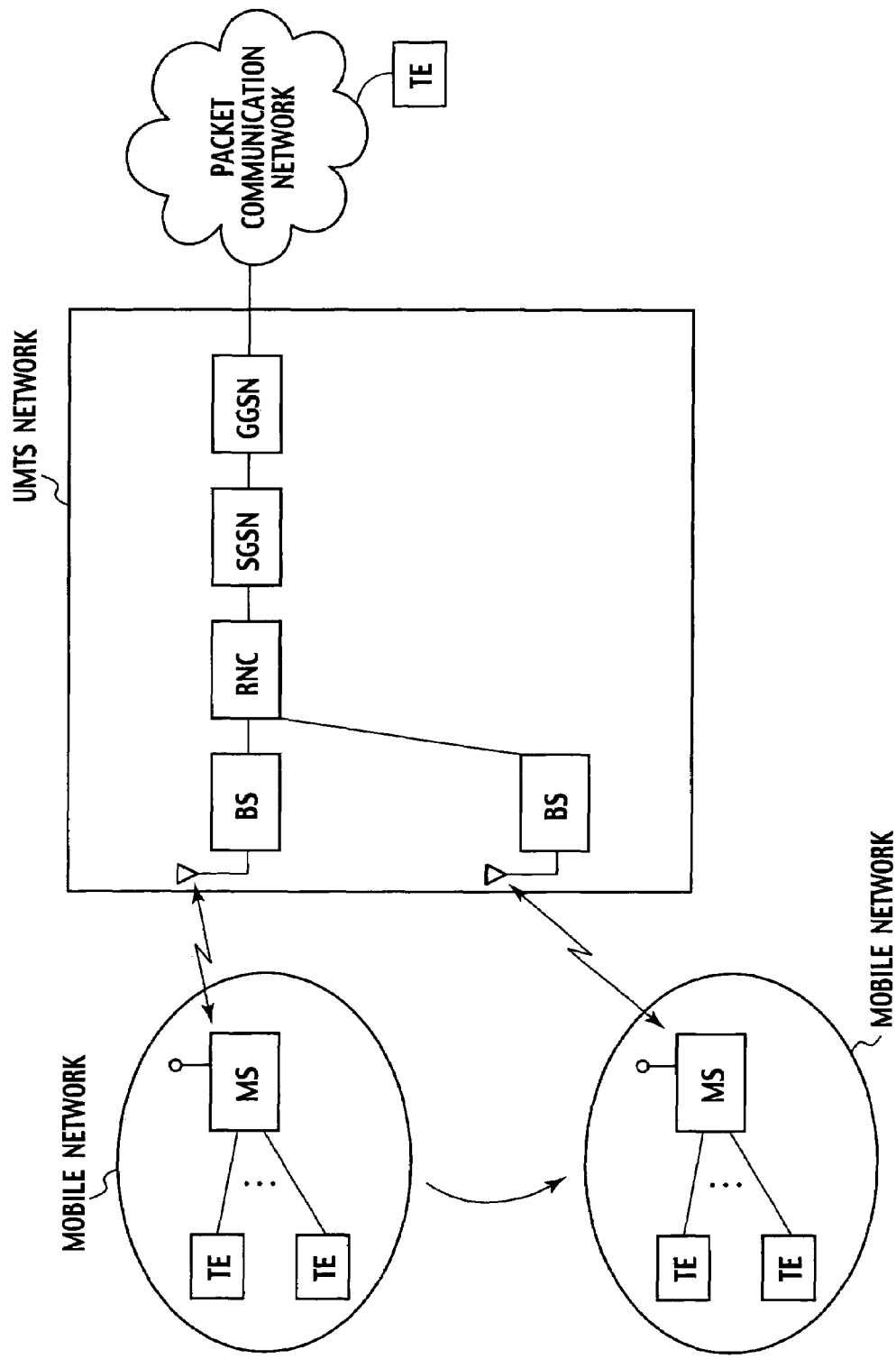
FIG. 3 is an entire structural diagram of a radio communication system for implementing a packet communication method according to an embodiment of the present invention.

As shown in FIG. 3, in a radio communication system according to this embodiment, mobile networks are connected to an external packet communication network through a UMTS network. In each mobile network, communication terminals TE are connected to a mobile station MS, and are configured to be able to access the UMTS network via a radio interface of the mobile station MS.

In the UMTS network, base stations BS, a radio network controller RNC, a subscriber node SGSN, and a gateway node GGSN are disposed. Here, the subscriber node SGSN is provided with an interface with the gateway node GGSN, and the gateway node GGSN is provided with interfaces with the subscriber node SGSN and the packet communication network.

Figure 4:
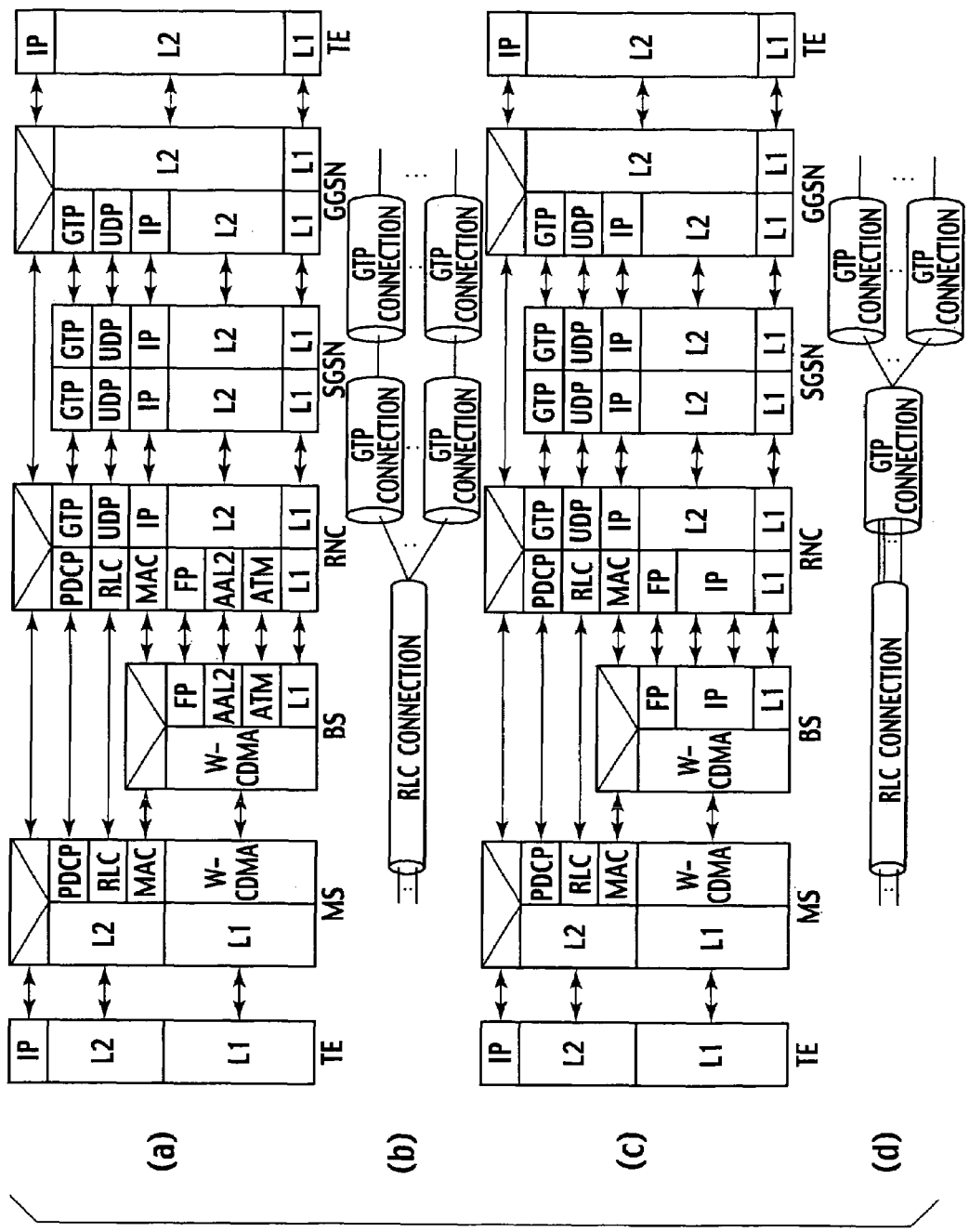
FIGS. 4(a) to 4(d) are diagrams showing protocol stacks for implementing the packet communication method according to the embodiment of the present invention.

With reference to FIGS. 4($a$) to 4($c$), a protocol stack in the radio communication system according to this embodiment will be described.

As shown in FIG. 4($a$), in the radio communication system according to this embodiment, an RLC connection based on the RLC protocol, which is one of the radio layer 2 protocols, is established between the mobile station MS and the radio network controller RNC.

Here, the radio layer 2 protocols are provided in layers higher than a physical layer (L1) and transport technology layers (ATM/AAL/FP in the example of FIG. 4($a$)), and constituted by the Packet Data Convergence Protocol (PDCP), the RLC protocol, and the Medium Access Control (MAC) protocol.

The RLC protocol has the function of multiplexing and dividing data packets (e.g., IP packets) received from an upper layer (e.g., the PDCP protocol). An RLC-PDU used in the RLC protocol has a time length of 10 ms. The byte length of an RLC-PDU is determined by the speed of an RLC connection. For example, the byte length of an RLC-PDU on an RLC connection set at a speed of 384 kbps is 480 bytes.

Also, when establishing an RLC connection, the RLC protocol determines which of Transparent Mode (TM), Unacknowledgement Mode (UM) and Acknowledgement Mode (AM) to provide to an upper layer.

Here, TM has the function of transferring a data packet received from an upper layer to a lower layer (MAC protocol) directly or after dividing it as necessary. TM also has the function of transferring data received from a lower layer to an upper layer directly or after composing it as necessary.

UM and AM can divide or multiplex data packets received from an upper layer to load into RLC-PDUs, and are suitable for transferring variable-length data such as IP packets. RLC-PDUs are transferred to a lower layer (a transport technology layer or a radio access technology layer) through the MAC protocol. Here, UM does not have a data retransmission function, while AM has the function of correcting an error caused by quality deterioration in a radio zone by data retransmission control.

Also, as shown in FIG. 4($a$), in the radio communication system according to this embodiment, an ATM connection of ATM Adaptation Layer type 2 (AAL2) is established by the ATM technology, one type of transport technology, between the base station BS and the radio network controller RNC.

As shown in FIG. 4($c$), the radio communication system of this embodiment may alternatively be configured so that communication is performed by the IP technology, one type of transport technology, between the base station BS and the radio network controller RNC.

In the radio communication system of this embodiment, MAC-PDUs are transmitted and received by the CDMA technology, one type of radio access technology, between the base station BS and the mobile station MS.

In the radio communication system of this embodiment, for the mobility of the communication terminals TE, a data packet transmitted from a communication terminal TE and even having a destination address like an IP packet, is transferred on a tunneling connection (such as an ATM connection, IP tunneling connection or MPLS connection) established by a transport technology.

This embodiment uses the RLC protocol specified in 3GPP as one of the radio layer 2 protocols, but may alternatively be configured to use the LAC protocol specified in 3GPP2.

Figure 5:
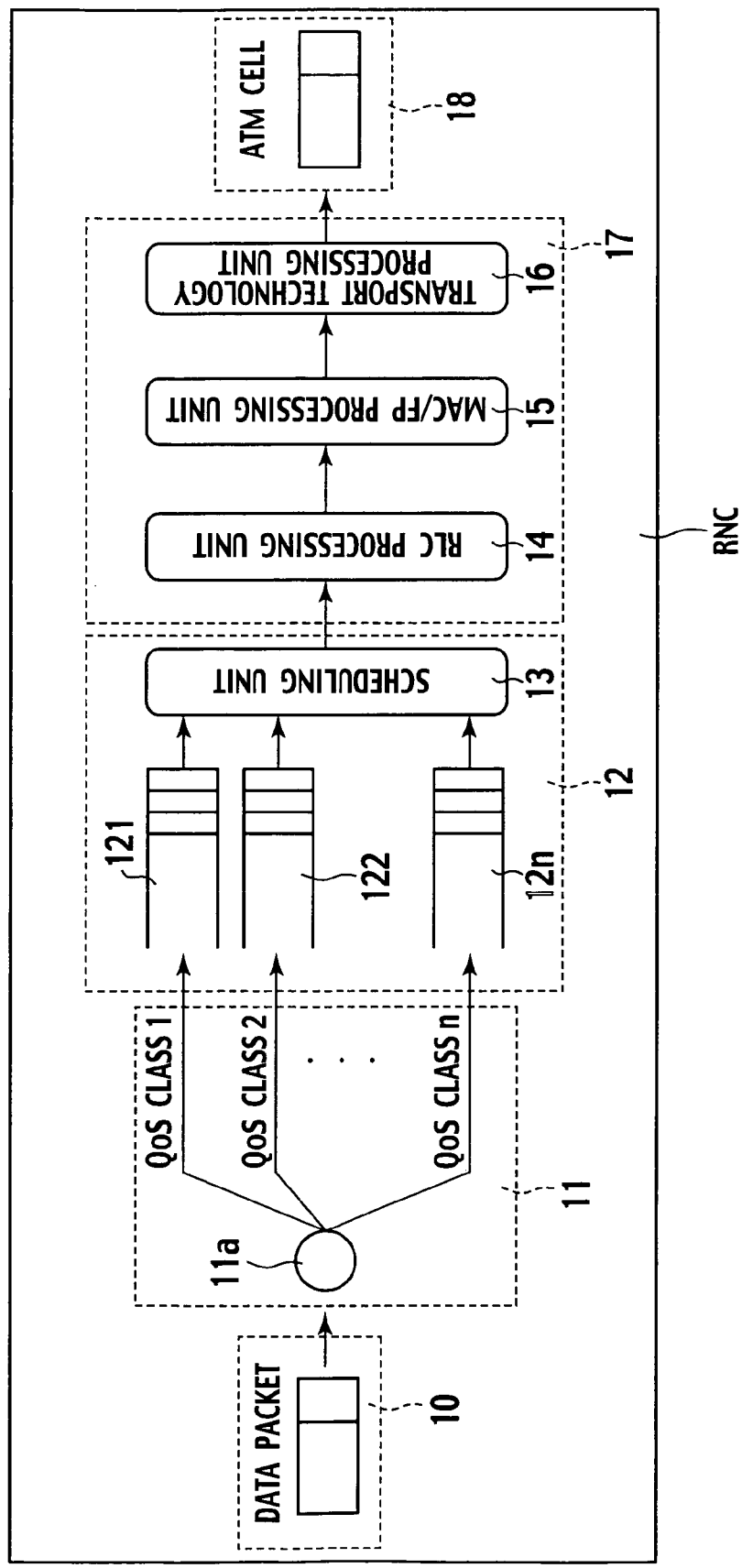
FIG. 5 is a functional block diagram of a radio network controller according to the embodiment of the present invention.

FIG. 5 shows functional blocks of the radio network controller RNC according to this embodiment. As shown in FIG. 5, the radio network controller RNC includes a data packet receiving unit 10, a QoS detecting unit 11, a transmission timing determining unit 12, a framing unit 17, and a transmitting unit 18.

The data packet receiving unit 10 is configured to receive data packets through a GTP connection (tunneling connection) established with the gateway node GGSN based on the GTP protocol.

The QoS detecting unit 11 is configured to detect QoS requirements (qualities of service) set in data packets received by the data packet receiving unit 10.

More specifically, the QoS detecting unit 11 is constituted by a QoS sorting unit 11$a$ which sorts data packets inputted from the data packet receiving unit 10 into queues 12₁ to 12$n$ provided for QoS classes 1 to n, respectively, for input, according to QoS requirements set in the data packets.

Here, a QoS requirement set in a data packet may be a "Differentiated Services Code Point (DSCP)" in an IP packet, for example.

The transmission timing determining unit 12 is constituted by the queues 12₁ to 12$n$ and a scheduling unit 13.

The scheduling unit 13 is configured to sequentially output data packets in the queues 12₁ to 12$n$ to the framing unit 17 by scheduling and priority control based on a predetermined policy.

Specifically, the scheduling unit 13 is configured to determine transmission timings of data packets in the queues 12₁ to 12$n$, based on QoS requirements detected by the QoS detecting unit 11, and transmit the data packets at the determined transmission timings to the framing unit 17.

Figure 6:
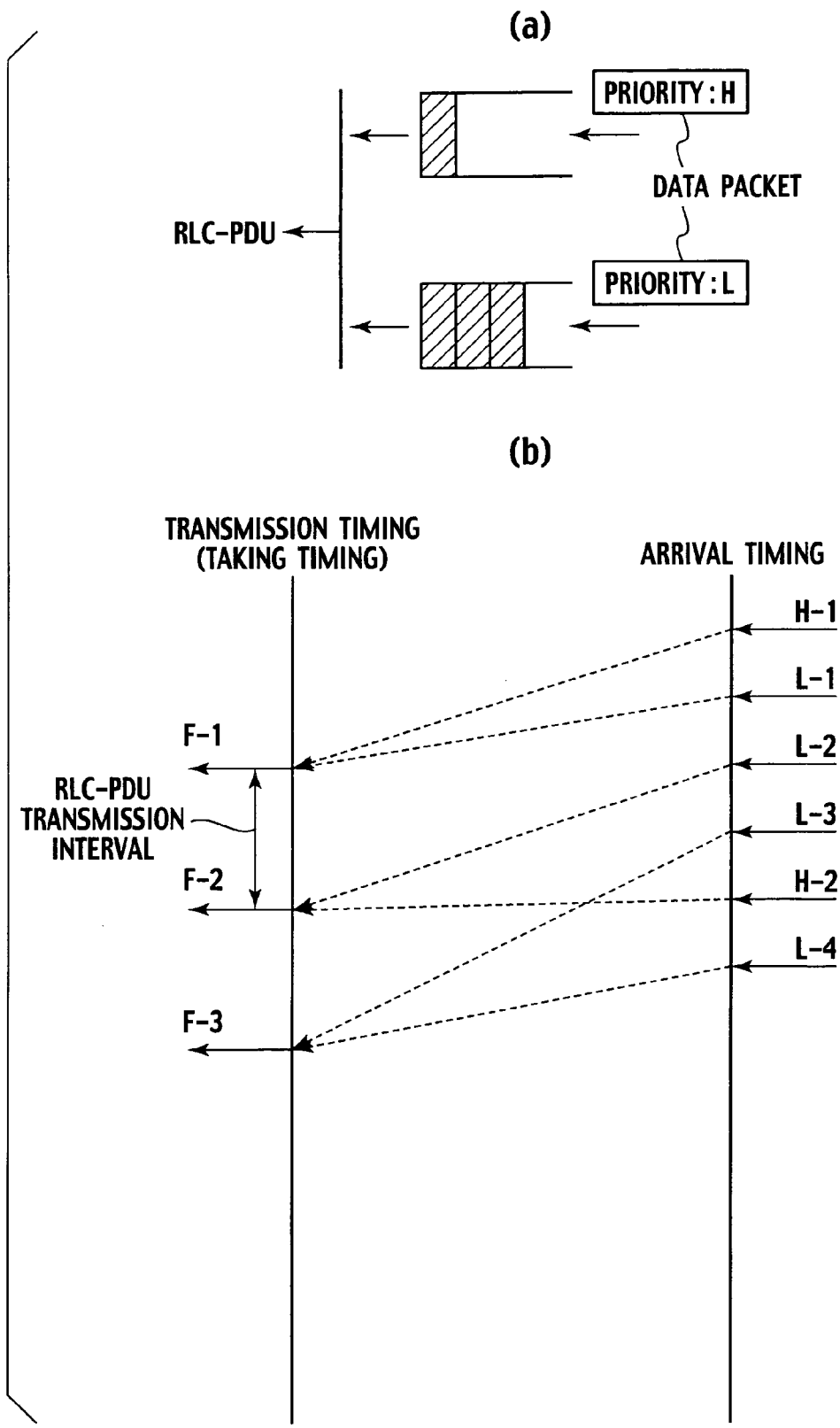
FIGS. 6(a) and 6(b) are diagrams for illustrating the operation of loading data packets in RLC-PDUs in the radio network controller according to the embodiment of the present invention.

With reference to FIGS. 6($a$) and 6($b$), a specific example of operation of the scheduling unit 13 will be described. As shown in FIG. 6($a$), for example, the data packet receiving unit 10 receives two kinds of data packets, a data packet in which high priority "H" is set as a QoS requirement, and a data packet in which low priority "L" is set as a QoS requirement.

In this case, as shown in FIG. 6(b), the scheduling unit 13 takes certain data packets at a determined transmission timing (taking timing) from the queues 121 to 12n. Here, an RLC-PDU has a size of 1000 bytes, and a data packet has a size of 500 bytes. An RLC-PDU has a fixed length. RLC-PDUs are transmitted at regular intervals.

As shown in FIG. 6(b), a data packet in which the high priority "H" is set is taken in priority to a data packet in which the low priority "L" is set. For example, a data packet of priority "H-2" which arrives later than a data packet of priority "L-3" is taken at transmission timing "F2", and the data packet of priority "L-3" is kept queued until transmission timing "F3".

The framing unit 17 is configured to multiplex data packets outputted from the scheduling unit 13 into fixed-length radio layer 2 protocol data units (RLC-PDUs), which are transmitted and received on a radio layer 2 connection (RLC connection).

Specifically, the framing unit 17 is constituted by an RLC processing unit 14, an MAC/FP processing unit 15, and a transport technology processing unit 16.

The RLC processing unit 14 is configured to multiplex and load a data packet outputted from the scheduling unit 13 at the above transmission timing, partly or entirely into an RLC-PDU. The RLC processing unit 14 is configured to perform PDCP protocol processing on the data packet as necessary.

The MAC/FP processing unit 15 is configured to perform MAC protocol processing on an RLC-PDU generated by the RLC processing unit 14 to generate an MAC-PDU. Also, the MAC/FP processing unit 15 is configured to frame a generated MAC-PDU in an FP frame.

The transport technology processing unit 16 is configured to load an FP frame generated by the MAC/FP processing unit 15 in an ATM cell which is transmitted and received on an AAL2 ATM connection.

Figure 7:
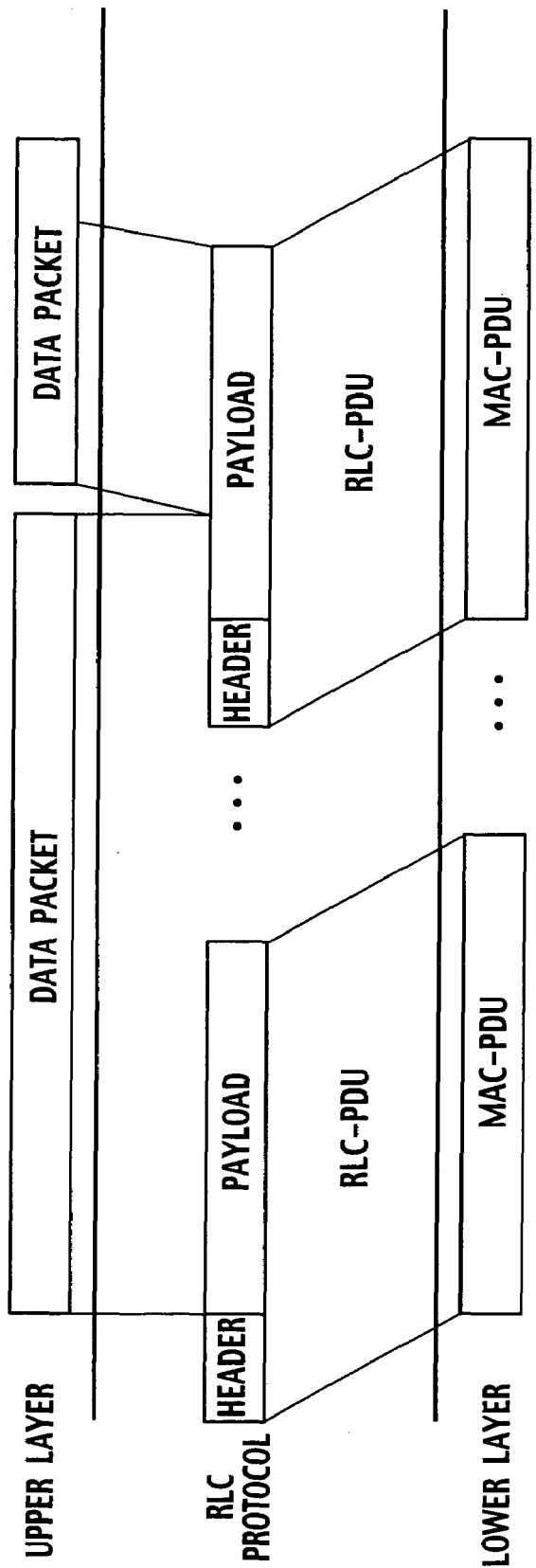
FIG. 7 is a diagram illustrating the way of loading data packets in MAC-PDUs in the packet communication methods according to the related art and the embodiment of the present invention.

The transport technology processing unit 16 may alternatively be configured to load an FP frame generated by the MAC/FP processing unit 15 in an IP packet which is transmitted and received on an IP tunneling connection, or in an IP packet which is transmitted and received on an MPLS connection. With reference to FIG. 7, a specific example of operation of the framing unit 17 in such a case will be described. As shown in FIG. 7, the payload in an RLC-PDU has a fixed length, and data packets in an upper layer have variable lengths. Therefore, data packets shorter than the payload length of an RLC-PDU are multiplexed and loaded into a single RLC-PDU. A data packet which cannot be loaded in a single RLC-PDU is divided, and a part of it is loaded in the next RLC-PDU.

The transmitting unit 18 is configured to transmit an MAC-PDU loaded with an RLC-PDU loaded with a data packet(s), through a radio layer 2 connection (RLC connection) established based on a radio layer 2 protocol (RLC protocol) with a mobile station MS.

The transmitting unit 18 is configured to perform QoS control in units of AAL2 ATM connections, using a traffic management technique in the ATM technology, on communication with a base station BS. The transmitting unit 18 may alternatively be configured to perform QoS control in units of IP tunneling connections (MPLS connections) or in units of IP packets, using a traffic management technique in the IP technology, on communication with a base station BS.

Figure 8:
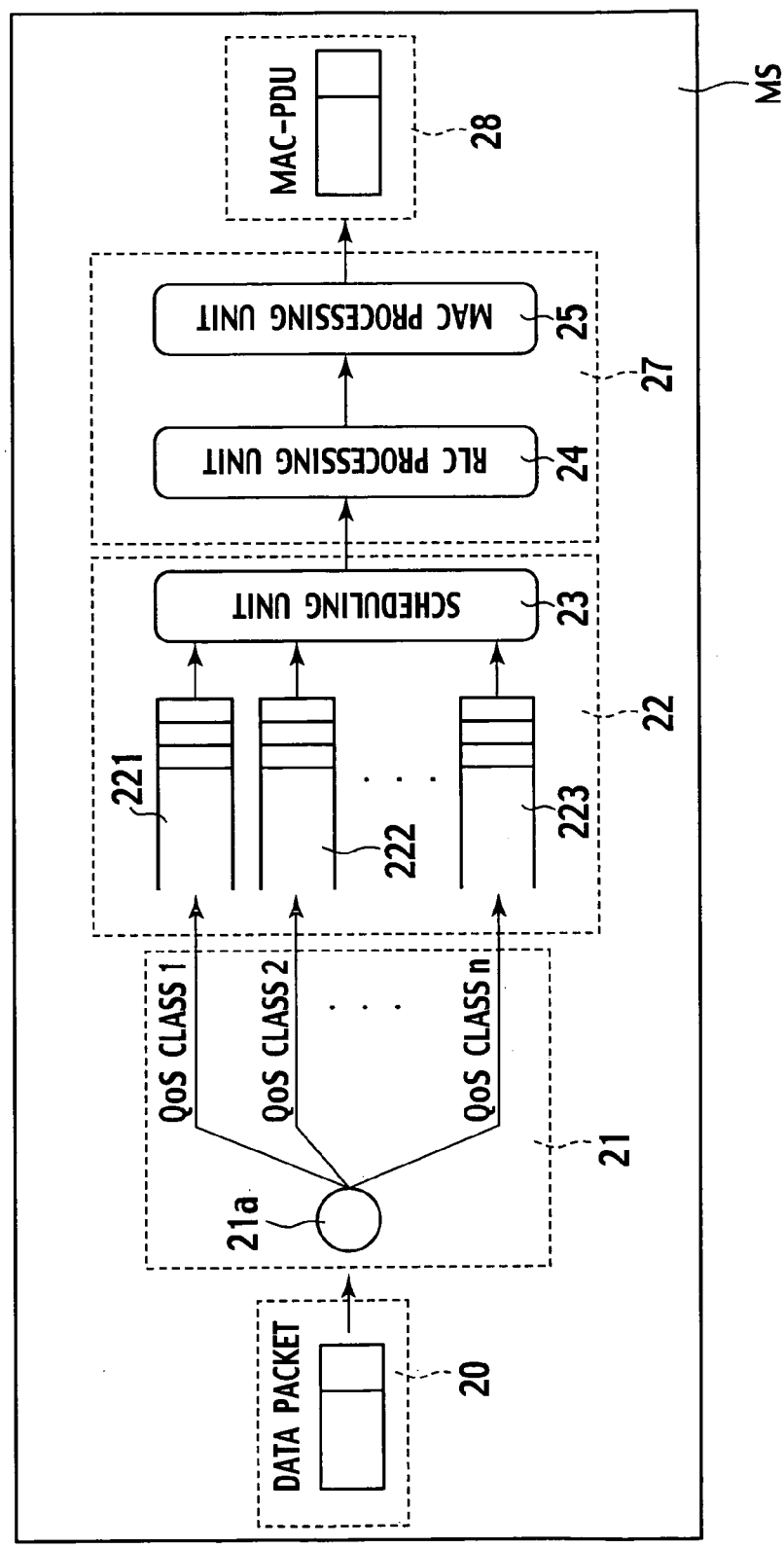
FIG. 8 is a functional block diagram of a mobile station according to the embodiment of the present invention.

FIG. 8 shows functional blocks of a mobile station MS according to this embodiment. As shown in FIG. 8, the mobile station MS includes a data packet receiving unit 20, a QoS detecting unit 21, a transmission timing determining unit 22, a framing unit 27, and a radio access communication unit 28.

The mobile station MS of this embodiment has a configuration similar to that of the above-described radio network controller RNC, except that a transport technology processing unit is not included in the framing unit 27, and the radio access communication unit 28 is provided in place of the transmitting unit 18.

The radio access communication unit 28 is configured to transmit MAC-PDUs generated by an MAC processing unit 25 to a base station BS, using a radio access technology such as the CDMA technology.

Hereinafter, with reference to FIG. 9, an operation for the radio network controller RNC in this embodiment having the above configuration to perform transmission and reception of data packets will be described.

Figure 9:
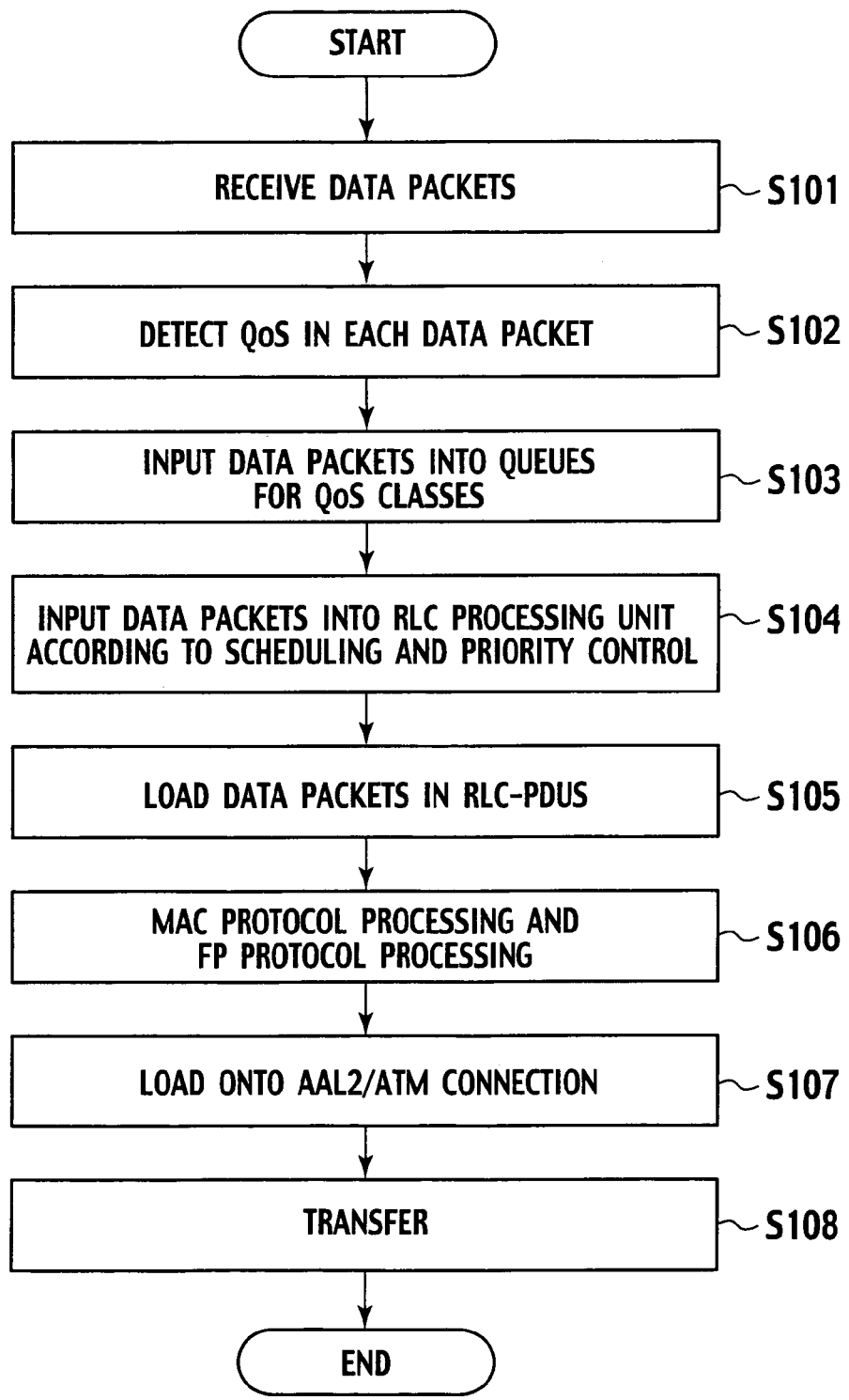
FIG. 9 is a flowchart showing an operation for the radio network controller to relay data packets in the packet communication method according to the embodiment of the present invention.

As shown in FIG. 9, in step S101, the data packet receiving unit 10 of the radio network controller RNC receives data packets from the subscriber node SGSN.

In step S102, the QoS detecting unit 11 detects QoS requirements set in the data packets received by the data packet receiving unit 10. In step S103, the QoS sorting unit 11a inputs the data packets into the queues 121 to 12n provided for different QoS classes, according to the detected QoS requirements.

In step S104, the scheduling unit 13 sequentially outputs the data packets sorted according to QoS, to the RLC processing unit 14 by predetermined scheduling and priority control.

In step S105, the RLC processing unit 14 loads the data packets outputted from the scheduling unit 13 into RLC-PDUs. The length and transmission intervals of RLC-PDUs are determined when an RLC connection is established, and are fixed. RLC-PDUs are generated in conjunction with transmission timings determined at the scheduling unit 13. In this embodiment, the timing of generating an RLC-PDU is not changed by the data packet input traffic status.

When a space area is left in an RLC-PDU without any other data packet to transmit, the RLC-PDU is transmitted with the space area padded. When only part of a data packet can be loaded in an RLC-PDU, the remaining part of the data packet is loaded at the head of the payload of the next RLC-PDU. When there is not any data packet to be loaded in an RLC-PDU, an RLC-PDU is not generated.

In step S106, the MAC/FP processing unit 15 performs MAC protocol processing on the generated RLC-PDUs (adding MAC headers as necessary), and frames them in FP frames. In an FP frame, one or more MAC-PDUs can be loaded, depending on a transmission time interval (TTI) set when an RLC connection is established.

In step S107, the transport technology processing unit 16 loads the generated FP frames in ATM cells which are transmitted and received on an AAL2 ATM connection.

In step S108, the transmitting unit 18 transfers the generated ATM cells. Here, since there is the possibility that a data packet requiring a high quality of service is loaded in an RLC-PDU, the transport technology processing unit 16 transfers data packets at the highest quality of service RLC-PDUs handle.

Figure 10:
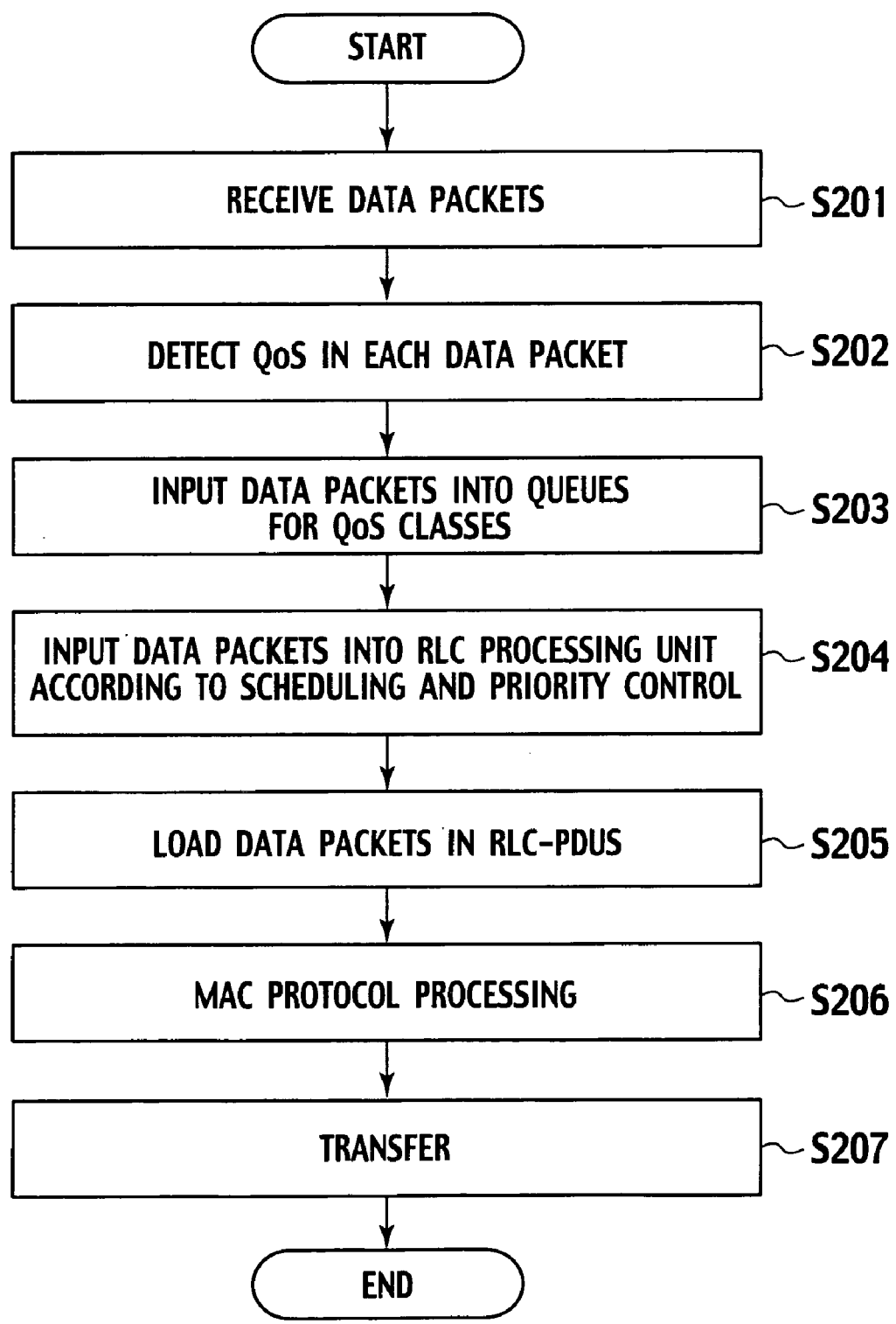
FIG. 10 is a flowchart showing an operation for the mobile station to relay data packets in the packet communication method according to the embodiment of the present invention.

Next, with reference to FIG. 10, an operation for a mobile station MS in this embodiment having the above configuration to perform transmission and reception of data packets will be described. Steps S201 to S205 are similar to steps S101 to S105 in FIG. 9.

In step S206, the MAC processing unit 25 performs MAC protocol processing on generated RLC-PDUs (adding MAC headers as necessary) to generate MAC-PDUs.

In step S207, the radio access communication unit 28 transmits the MAC-PDUs generated by the MAC unit 25 to the base station BS using a radio access technology such as the CDMA technology.

According to the radio communication system of this embodiment, QoS control dealing with qualities of service required by data packets can be performed in the RLC protocol, instead of in a transport technology such as the ATM technology or the IP technology, so that a delay in a tunneling connection such as an ATM connection can be reduced.

In particular, in a UTRAN, synchronous control is performed using sequence numbers in FP frames between a base station BS and a radio network controller RNC, and buffering is performed at a receiving end according to a maximum delay in FP frames. When QoS control in a transport technology causes large delay fluctuations in low-priority communication, a delay according to the maximum delay occurs constantly. Therefore, it is also effective to implement low-delay transfer in a transport technology to reduce the buffer amount at a receiving end and to prevent occurrence of constant delays in low-priority communication.

Also, according to the radio communication system of this embodiment, a mobile station MS can handle various communications by establishing a single RLC connection without establishing an RLC connection for each communication destination or QoS requirement.

[Modification 1]

Figure 11:
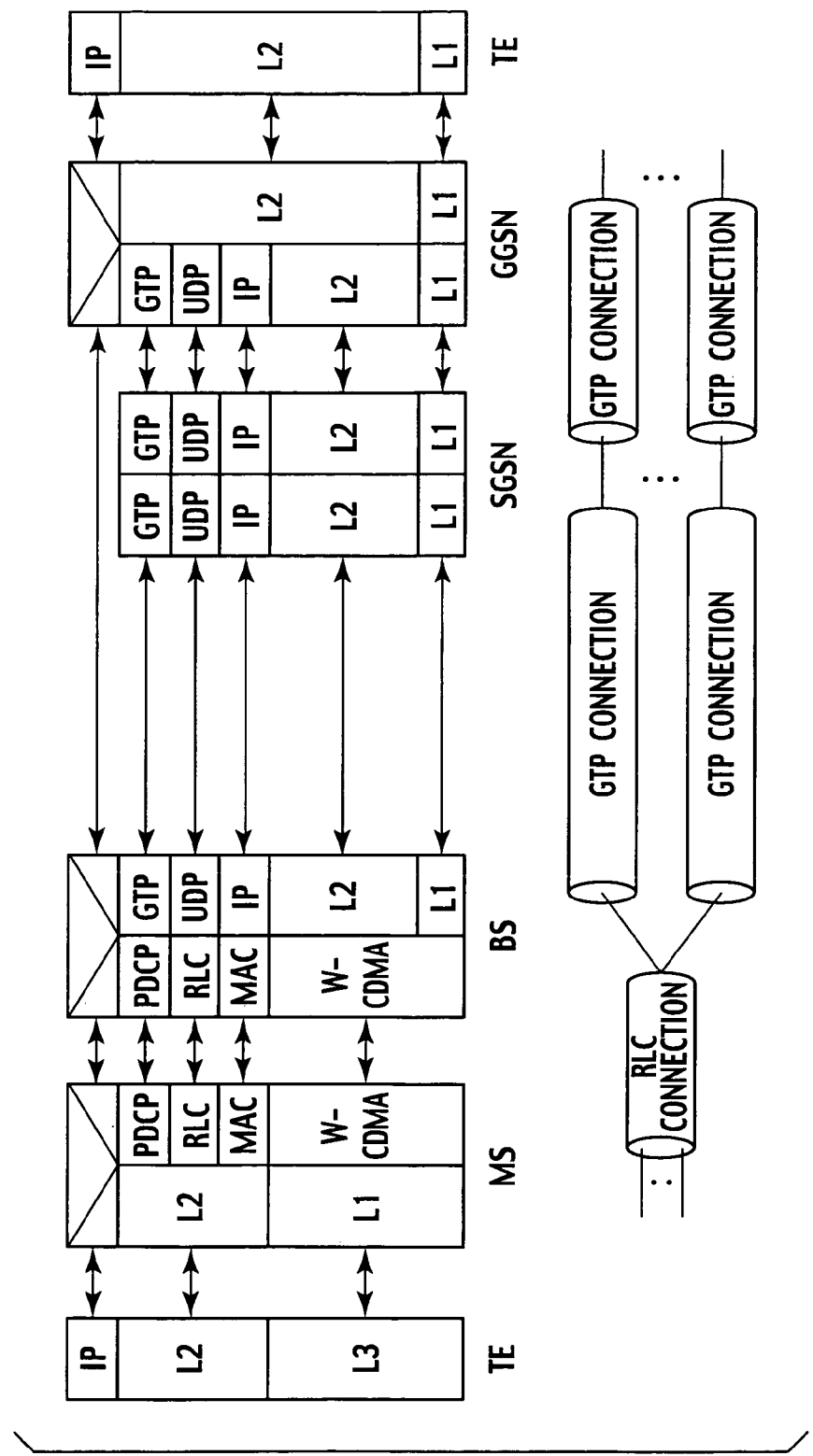
FIG. 11 is a diagram showing a protocol stack for implementing a packet communication method according to a modification of the present invention.

In a modification 1 of the present invention, a base station BS is configured to include the functions of the radio network controller RNC shown in FIG. 5 to serve as a controller device in the present invention. FIG. 11 shows a protocol stack in a radio communication system according to the modification 1.

As shown in FIG. 11, the modification 1 is configured so that an RLC connection is established between a mobile station MS and a base station BS, and a GTP connection is established between a base station BS and a subscriber node SGSN.

Second Embodiment

Next, a second embodiment of the present invention will be described. This embodiment will be described with a focus on an operation in the radio communication system according to the above-described first embodiment when a transmitting communication terminal TE performing certain communication with a receiving communication terminal TE starts communication with a different QoS requirement or communication with a different receiving communication terminal.

A radio communication system according to this embodiment is configured so that, as shown in FIG. 4(*d*), a radio network controller RNC associates, one-to-one, an RLC connection established between a mobile station MS and the radio network controller RNC with a GTP connection established between the radio network controller RNC and a subscriber node SGSN, and the subscriber node SGSN associates a single GTP connection established between the radio network controller RNC and the subscriber node SGSN with a plurality of GTP connections established between the subscriber node SGSN and a gateway node GGSN.

Figure 12:
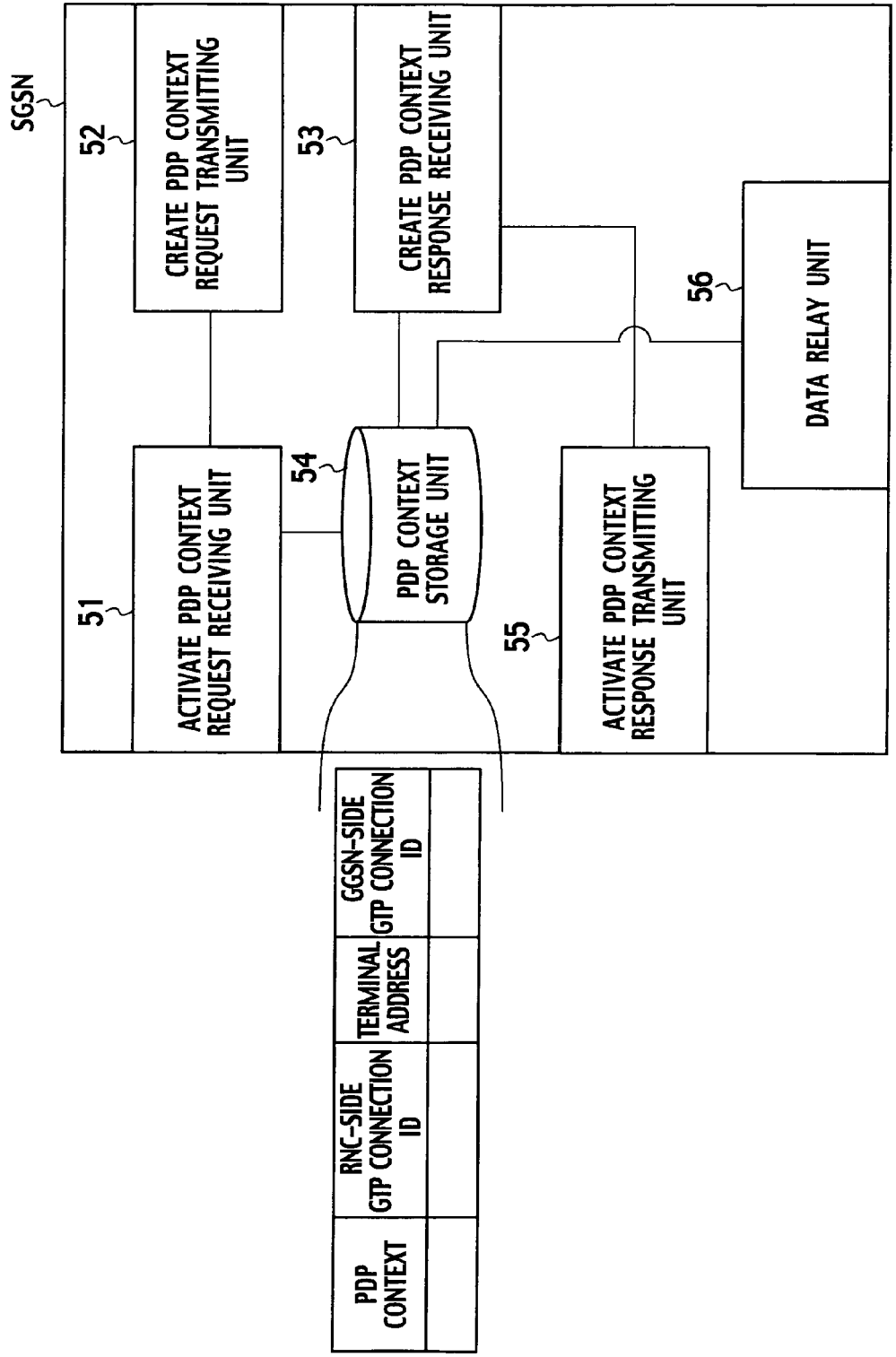
FIG. 12 is a functional block diagram of a subscriber node according to the embodiment of the present invention.

As shown in FIG. 12, the subscriber node SGSN of this embodiment includes an Activate PDP Context Request receiving unit 51, a Create PDP Context Request transmitting unit 52, a Create PDP Context Response receiving unit 53, a PDP context storage unit 54, an Activate PDP Context Response transmitting unit 55, and a data relay unit 56.

The Activate PDP Context Request receiving unit 51 is configured to receive an Activate PDP Context Request transmitted from a mobile station MS. The Activate PDP Context Request is for requesting start of new communication between a transmitting communication terminal TE and a receiving communication terminal TE, specifying a QoS requirement and a communication destination.

The Create PDP Context Request transmitting unit 52 is configured to establish a GTP connection (tunneling connection) with the gateway node GGSN in accordance with a received Activate PDP Context Request.

The Create PDP Context Response receiving unit 53 is configured to receive a Create PDP Context Response and a terminal address transmitted from the gateway node GGSN. The terminal address may be included in the Create PDP Context Response for transmission, or may be transmitted separately from the Create PDP Context Response.

The PDP context storage unit 54 is configured to associate a terminal address included in a data packet transmitted from a mobile station MS through the radio network controller RNC with a GTP connection (tunneling connection), cooperating with the Activate PDP Context Request receiving unit 51 and the Create PDP Context Response receiving unit 53.

Specifically, as shown in FIG. 12, the PDP context storage unit 54 is configured to store a PDP context, an RNC-side GTP connection ID, a terminal address, and a GGSN-side GTP connection ID, which are associated with one another.

The PDP context storage unit 54 stores a PDP context (e.g., QoS requirement information and communication destination information) included in an Activate PDP Context Request received by the Activate PDP Context Request receiving unit 51.

The PDP context storage unit 54 also stores a GGSN-side GTP connection ID and a terminal address included in a Create PDP Context Response received by the Create PDP Context Response receiving unit 53.

Here, the terminal address is an address (e.g., an IP address) used by a transmitting communication terminal TE in communication newly started between the transmitting communication terminal TE and a receiving communication terminal TE, and may be assigned by the gateway node GGSN at the start of communication, or may be assigned fixedly to the transmitting communication terminal TE.

The Activate PDP Context Response transmitting unit 55 is configured to transmit an Activate PDP Context Response to a mobile station MS through a GTP connection with the radio network controller RNC when detecting completion of establishment of a GTP connection between the subscriber node SGSN and the gateway node GGSN.

The data relay unit 56 is configured to extract a GGSN-side GTP connection ID from the PDP context storage unit 54 based on a terminal address included in a data packet (GTP-PDU) transmitted from a transmitting communication terminal TE through a GTP connection established with the radio network controller RNC, to transfer the data packet to a GTP connection having the GGSN-side GTP connection ID.

The data relay unit 56 is also configured to extract an RNC-side GTP connection ID from the PDP context storage unit 54 based on the GGSN-side GTP connection ID of a GTP connection established with the gateway node GGSN through which a data packet from a receiving communication terminal TE has passed, to transfer the data packet to a GTP connection having the RNC-side GTP connection ID.

Figure 13:
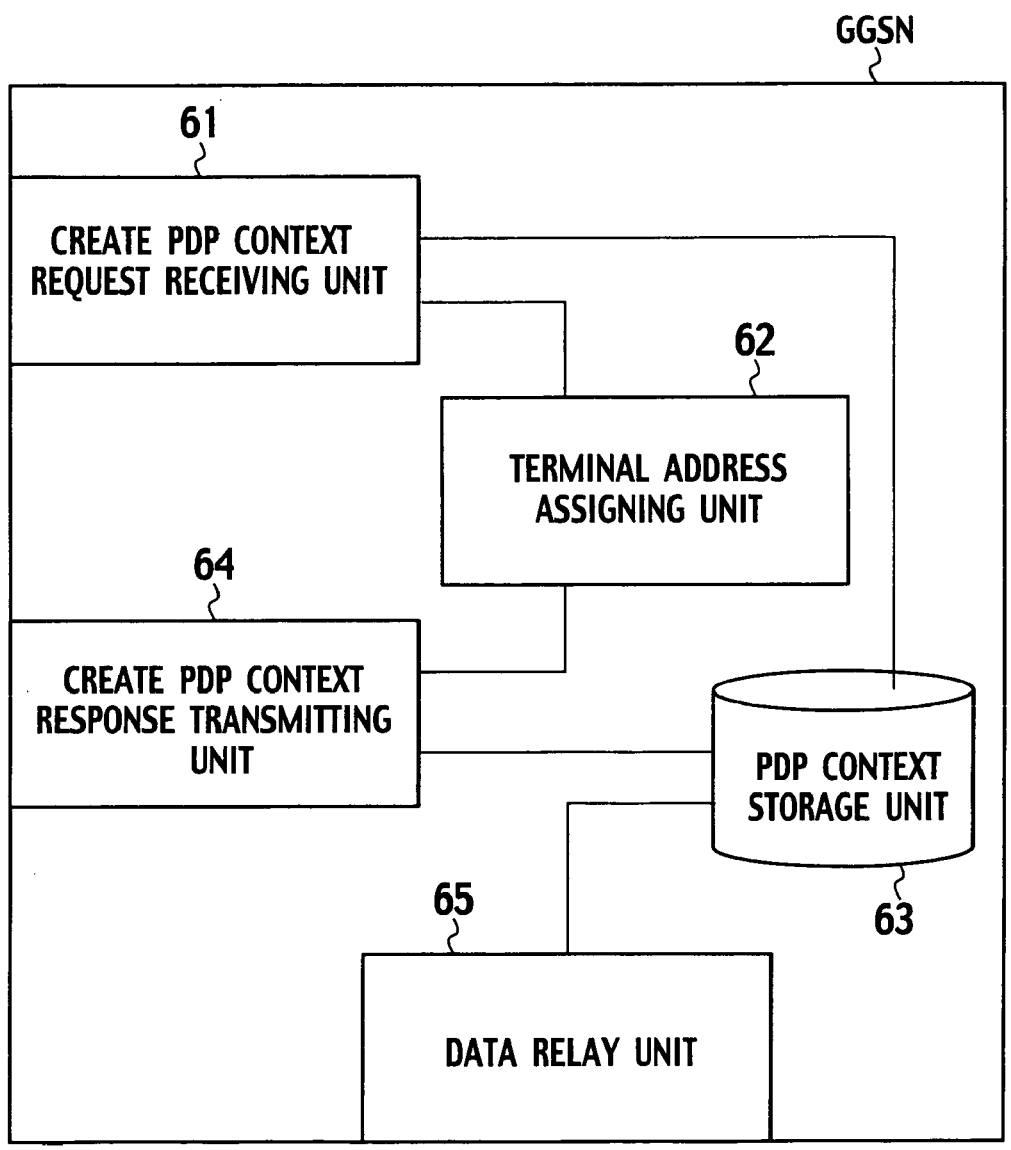
FIG. 13 is a functional block diagram of a gateway node according to the embodiment of the present invention.

As shown in FIG. 13, the gateway node GGSN in this embodiment includes a Create PDP Context Request receiving unit 61, a terminal address assigning unit 62, a PDP context storage unit 63, a Create PDP Context Response transmitting unit 64, and a data relay unit 65.

The Create PDP Context Request receiving unit 61 is configured to receive a Create PDP Context Request transmitted from the subscriber node SGSN.

The terminal address assigning unit 62 is configured to assign a terminal address to be used by a transmitting communication terminal TE in newly started communication, in accordance with a Create PDP Context Request received by the Create PDP Context Request receiving unit 61.

For example, the terminal address assigning unit 62 may be configured to extract an unused address from a predefined address space to assign it as a terminal address, or may be configured to assign a terminal address by negotiation with an external server device or the like.

The PDP context storage unit 63 is configured to create and store a PDP context related to newly started communication, in accordance with a Create PDP Context Request received by the Create PDP Context Request receiving unit 61.

The Create PDP Context Response transmitting unit 64 is configured to transmit a Create PDP Context Response to the subscriber node SGSN as a response to a Create PDP Context Request.

The data relay unit 65 is configured to refer to the PDP context storage unit 63 to transfer a data packet transmitted from the subscriber node SGSN to the packet communication network. The data relay unit 65 is also configured to refer to the PDP context storage unit 63 to transfer a data packet transmitted from the packet communication network to the subscriber node SGSN.

Hereinafter, with reference to FIG. 14, description will be made on an operation in the radio communication system of this embodiment, in which the subscriber node SGSN and the gateway node GGSN, which have established a single PDP context for communication of a mobile station MS, establish a different PDP context due to a different QoS requirement or communication destination when the mobile station MS starts new communication.

Figure 14:
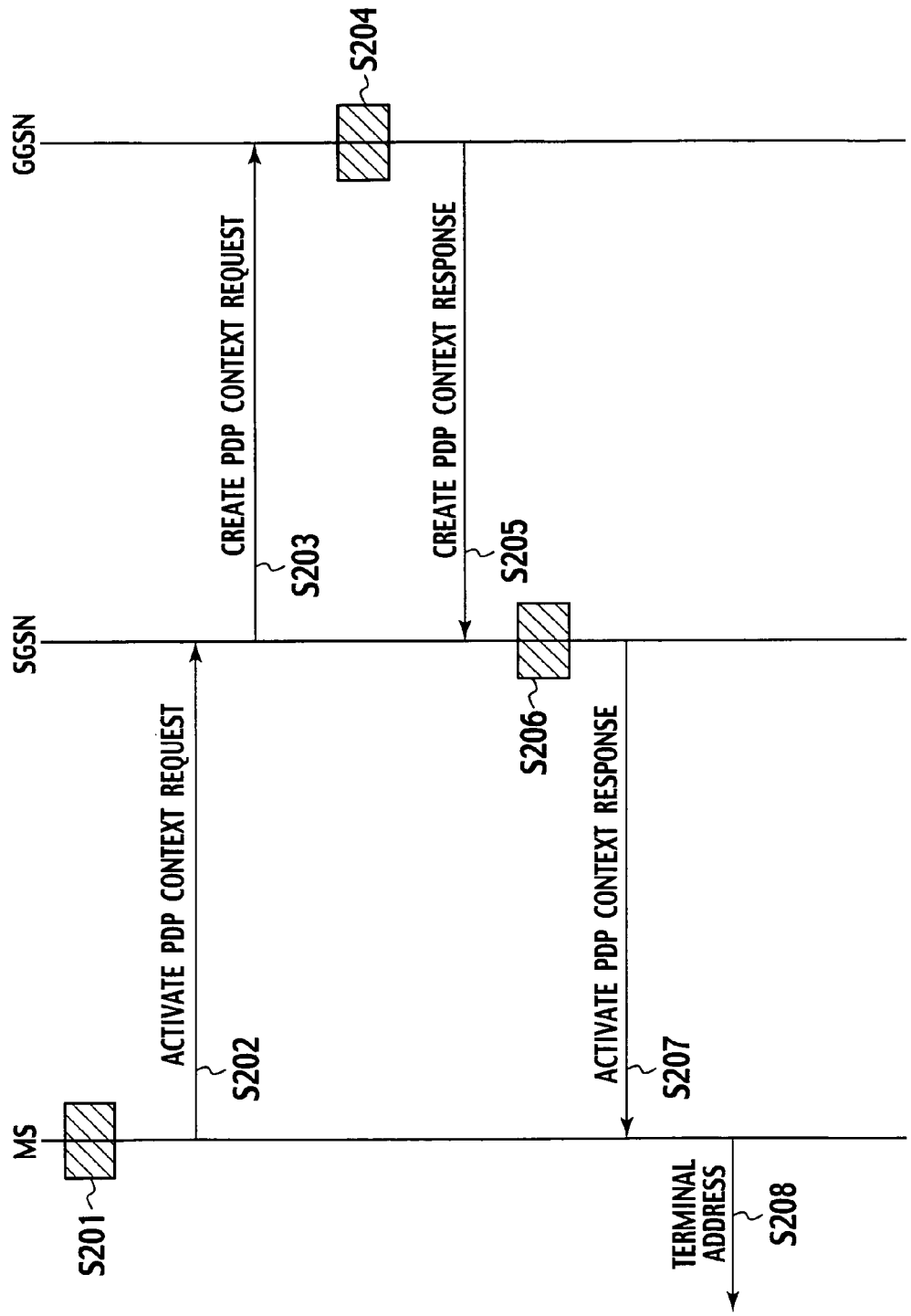
FIG. 14 is a sequence diagram showing the operation of associating a GTP connection with a terminal address in the packet communication method according to the embodiment of the present invention.

As shown in FIG. 14, in step S201, the mobile station MS has established an RLC connection (radio access bearer) with the radio network controller RNC. The radio network controller RNC has established a GTP connection with the subscriber node SGSN.

In step S202, the mobile station MS transmits an Activate PDP Context Request to the subscriber node SGSN through the RLC connection established with the radio network controller RNC.

In step S203, the Create PDP Context Request transmitting unit 52 of the subscriber node SGSN transmits a Create PDP Context Request to the gateway node GGSN, in accordance with the Activate PDP Context Request received by the Activate PDP Context Request receiving unit 51.

In step S204, the terminal address assigning unit 62 of the gateway node GGSN assigns a terminal address to be given to data packets to be transmitted and received in newly started communication, in accordance with the Create PDP Context Request received by the Create PDP Context Request receiving unit 61.

In step S205, the Create PDP Context Response transmitting unit 64 of the gateway node GGSN communicates the terminal address assigned by the terminal address assigning unit 62, together with a Create PDP Context Response, to the subscriber node SGSN.

In step S206, the PDP context storage unit 54 of the subscriber node SGSN associates the terminal address communicated from the gateway node GGSN, the GGSN-side GTP connection ID of a GTP connection established with the gateway node GGSN, and the RNC-side GTP connection ID of the GTP connection established with the radio network controller RNC.

Here, the subscriber node SGSN establishes the new GTP connection with the gateway node GGSN according to the Create PDP Context Response from the gateway node GGSN. At this time, a GTP connection between the subscriber node SGSN and the radio network controller RNC and an RLC connection between the radio network controller RNC and the mobile station MS are not newly established, and those established for another communication (PDP context) are shared.

In step S207, the Activate PDP Context Response transmitting unit 55 of the subscriber node SGSN communicates, to the mobile station MS, the terminal address, together with an Activate PDP Context Response for communicating the fact that a PDP context for new communication has been created.

In step S208, the mobile station MS communicates the communicated terminal address to a transmitting communication terminal TE as necessary.

Next, with reference to FIG. 15, the operation of transferring data packets from a transmitting terminal TE to a receiving terminal TE in the radio communication system of this embodiment will be described.

Figure 15:
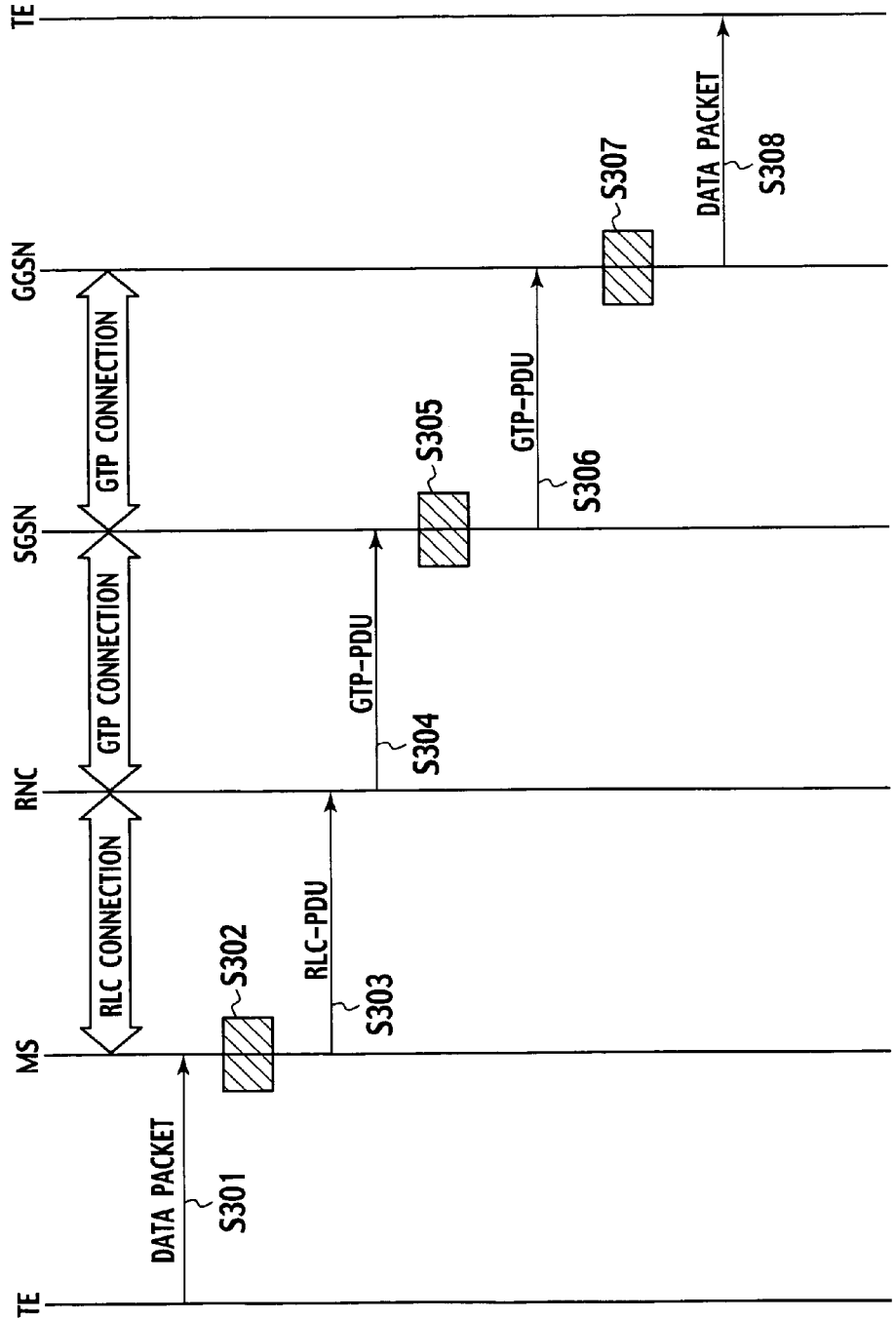
FIG. 15 is a sequence diagram showing the operation of relaying data packets from a transmitting communication terminal to a receiving communication terminal in the packet communication method according to the embodiment of the present invention.

As shown in FIG. 15, in step S301, a transmitting communication terminal TE transmits a data packet including, as a source address, a terminal address preassigned to the transmitting communicating terminal, and including, as a destination address, the address of a receiving communication terminal, to a mobile station MS in a mobile network.

In step S302, the mobile station MS multiplexes the received data packet into an RLC-PDU as described in the above-described first embodiment. In step S303, the mobile station MS transmits the RLC-PDU to the radio network controller RNC through an RLC connection established with the radio network controller RNC.

In step S304, the radio network controller RNC loads the data packet loaded in the received RLC-PDU in a GTP-PDU, and transmits it to the subscriber node SGSN through a GTP connection established with the subscriber node SGSN.

In step S305, the data relay unit 56 of the subscriber node SGSN extracts a GGSN-side GTP connection ID from the PDP context storage unit 54 based on the terminal address included in the data packet loaded in the received GTP-PDU. In step S306, the data relay unit 56 of the subscriber node SGSN transmits the GTP-PDU loaded with the data packet to the gateway node GGSN through a GTP connection having the GGSN-side GTP connection ID.

In step S307, the data relay unit 65 of the gateway node GGSN extracts the data packet from the received GTP-PDU. In step S308, the data relay unit 65 of the gateway node GGSN transfers the extracted data packet to the receiving communication terminal TE through the packet communication network.

[Modification 2]

A radio communication system according to a modification 2 of the present invention is configured so that, as shown in FIG. 4(*b*), a radio network controller RNC associates an RLC connection established between a mobile station MS and the radio network controller RNC with a plurality of GTP connections established between the radio network controller RNC and a subscriber node SGSN.

Figure 16:
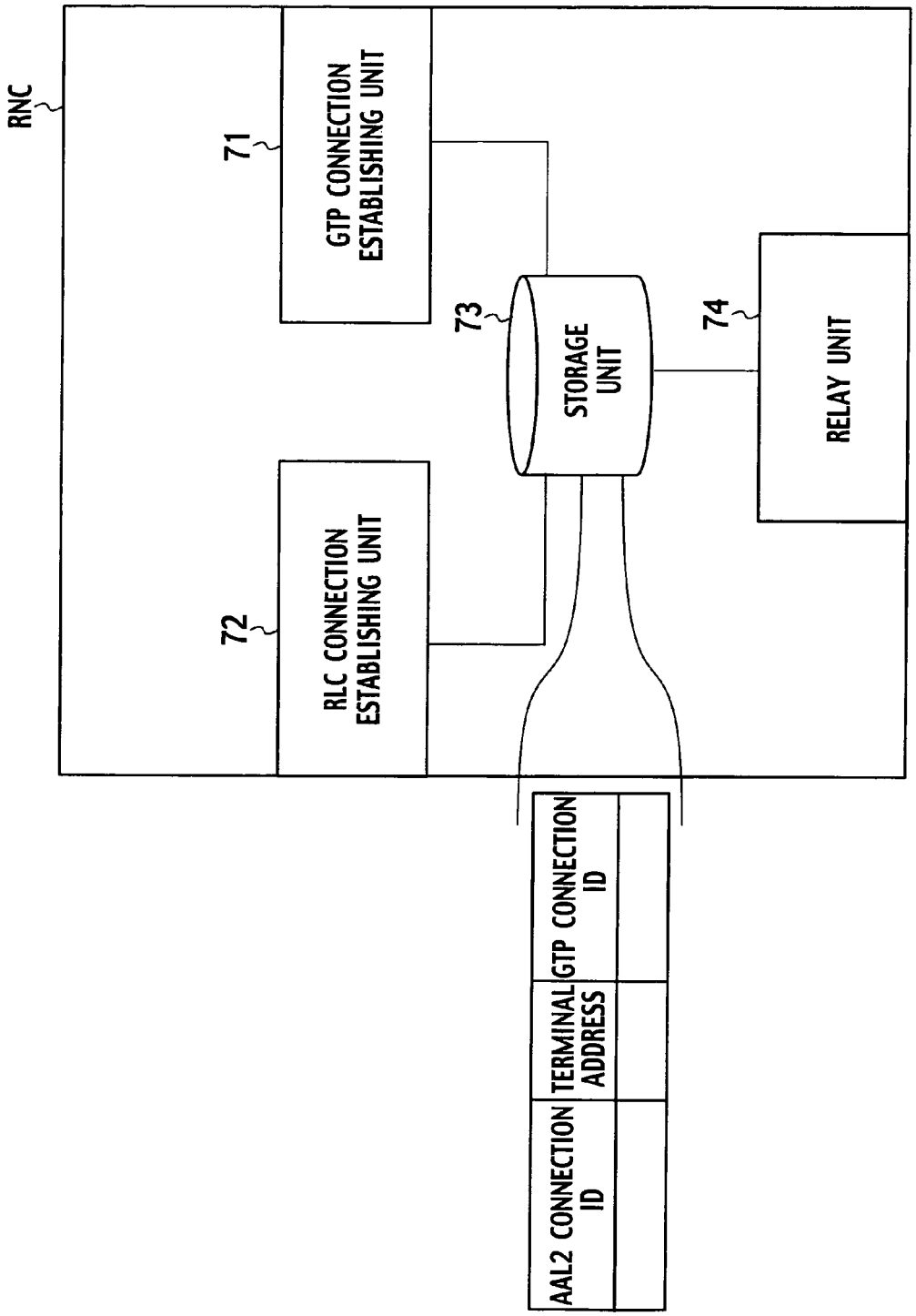
FIG. 16 is a functional block diagram of a radio network controller according to a modification 2 of the present invention.

As shown in FIG. 16, the radio network controller RNC of the modification 2 includes a GTP connection establishing unit 71, an RLC connection establishing unit 72, a storage unit 73, and a data relay unit 74.

The GTP connection establishing unit 71 is configured to establish a GTP connection (tunneling connection) with the subscriber node SGSN in accordance with a request from the subscriber node SGSN. The GTP connection establishing unit 71 is also configured to receive a terminal address communicated from the subscriber node SGSN.

The RLC connection establishing unit 72 is configured to establish an RLC connection with a mobile station MS in accordance with a request from the mobile station MS. The RLC connection establishing unit 72 may alternatively be configured to use an RLC connection which has already been established with a mobile station without establishing a new RLC connection, even when receiving a request from the mobile station MS.

Also, the RLC connection establishing unit 72 communicates a terminal address communicated from the subscriber node SGSN to a mobile station MS through an RLC connection established with the mobile station MS.

The storage unit 73 is configured to associate a terminal address included in a data packet transmitted from a mobile station MS with a GTP connection (tunneling connection), cooperating with the RLC connection establishing unit 72 and the GTP connection establishing unit 71.

Specifically, as shown in FIG. 16, the storage unit 73 is configured to store an AAL2 connection ID corresponding to an RLC connection, a terminal address, and a GTP connection ID, which are associated with one another.

The storage unit 73 also stores the GTP connection ID of a GTP connection established by the GTP connection establishing unit 71, and a terminal address received by the GTP connection establishing unit 71.

Here, the terminal address is an address (e.g., IP address) used by a transmitting communication terminal TE in communication newly started between the transmitting communication terminal TE and a receiving communicating terminal TE, and may be the one assigned by the gateway node GGSN at the start of communication, or may be the one assigned fixedly to the transmitting communication terminal TE.

The data relay unit 74 is configured to extract a GTP connection ID from the storage unit 75 based on a terminal address included in a data packet (GTP-PDU) transmitted from a transmitting communication terminal TE through an RLC connection established with a mobile station MS, and transfer the data packet to a GTP connection having the GTP connection ID.

The data relay unit 77 is also configured to extract an AAL2 connection ID from the storage unit 73 based on the GTP connection ID of a GTP connection established with the subscriber node SGSN through which a data packet from a receiving communication terminal TE has passed, and transfer the data packet to an RLC connection corresponding to an AAL2 connection having the AAL2 connection ID.

The gateway node GGSN according to the modification 2 is similar in configuration to the gateway node according to the second embodiment shown in FIG. 13.

Hereinafter, with reference to FIG. 17, description will be made on an operation in the radio communication system of the modification 2, in which the subscriber node SGSN and the gateway node GGSN, which have established a PDP context for communication of a mobile station MS, establishes a different PDP context due to a different QoS requirement or communication destination when the mobile station MS starts new communication.

Figure 17:
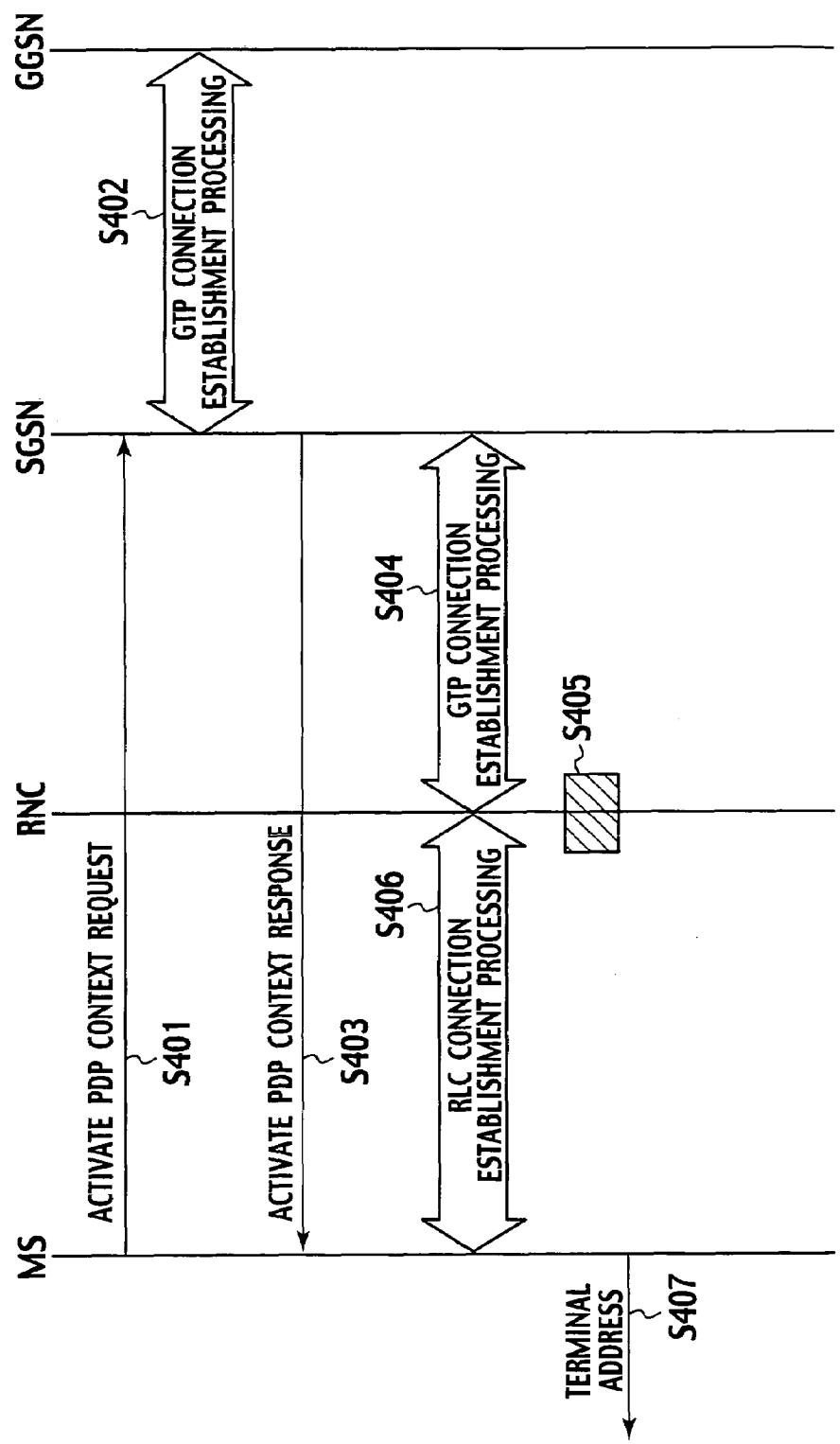
FIG. 17 is a sequence diagram showing the operation of associating a GTP connection with a terminal address in a packet communication method according to the modification 2 of the present invention.

As shown in FIG. 17, in step S401, the mobile station MS transmits an Activate PDP Context Request to the subscriber node SGSN when receiving a data packet addressed to a packet communication network from a transmitting communication terminal TE in a mobile network.

In step S402, the subscriber node SGSN transmits a Create PDP Context Request to the gateway node GGSN in accordance with the received Activate PDP Context Request, thereby performing GTP connection establishment processing with the gateway node GGSN. Specifically, the subscriber node SGSN and the gateway node GGSN perform the process of steps S203 to S206 shown in FIG. 14.

In step S403, the subscriber node SGSN transmits an Activate PDP Context Response to the mobile station MS.

In step S404, the GTP connection establishing unit 71 of the radio network controller RNC performs GTP connection establishment processing with the subscriber node SGSN in accordance with a request from the subscriber node SGSN. Here, the subscriber node SGSN communicates a terminal address communicated from the gateway node to the radio network controller RNC.

In step S405, the storage unit 75 of the radio network controller RNC associates the terminal address communicated from the subscriber node SGSN, the GTP connection ID of a GTP connection established with the subscriber node SGSN, and the AAL2 connection ID of an AAL2 connection corresponding to an RNC connection established with the mobile station MS.

In step S406, when an RLC connection (radio access bearer) has not been established with the mobile station MS, the RLC connection establishing unit 72 of the radio network controller RNC establishes an RLC connection.

In step S407, the mobile station MS communicates the communicated terminal address to the transmitting communication terminal TE as necessary.

Next, with reference to FIG. 18, the operation of transferring data packets from a transmitting terminal TE to a receiving terminal TE in the radio communication system of the modification 2 will be described.

Figure 18:
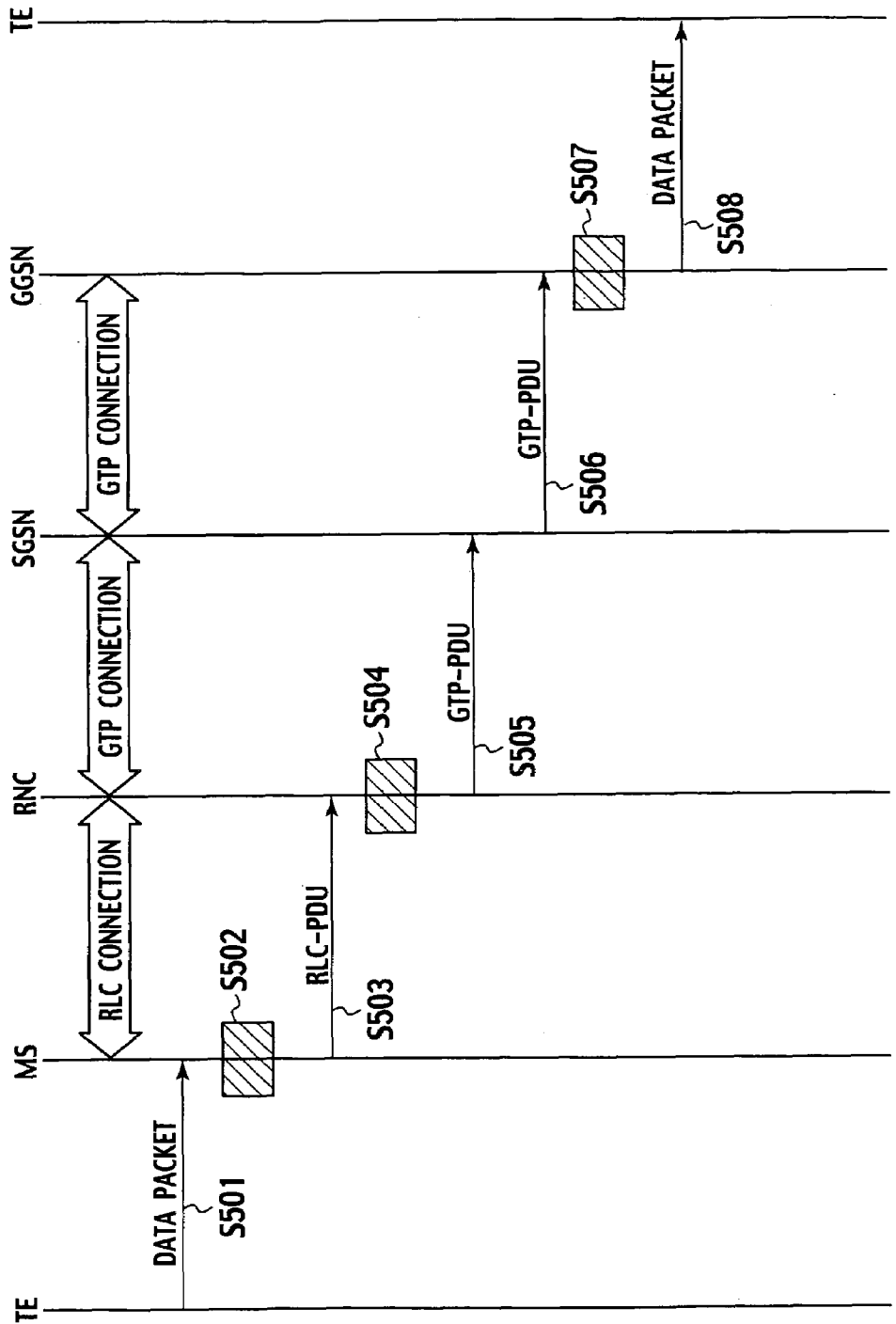
FIG. 18 is a sequence diagram showing the operation of relaying data packets from a transmitting communication terminal to a receiving communication terminal in the packet communication method according to the modification 2 of the present invention.

As shown in FIG. 18, in step S501, a transmitting communication terminal TE transmits a data packet including, as a source address, a terminal address preassigned to the transmitting communication terminal, and including, as a destination address, the address of a receiving communication terminal, to a mobile station MS in a mobile network.

In step S502, the mobile station MS multiplexes the received data packet into an RLC-PDU as described in the first embodiment. In step S503, the mobile station MS transmits the RLC-PDU to the radio network controller RNC through an RLC connection established with the radio network controller RNC.

In step S504, the data relay unit 77 of the radio network controller RNC extracts a GTP connection ID from the storage unit 75 based on the terminal address included in the data packet loaded in the received RLC-PDU. In step S505, the data relay unit 77 of the radio network controller RNC transmits a GTP-PDU loaded with the data packet to the subscriber node SGSN through a GTP connection having the GTP connection ID.

In step S506, the subscriber node SGSN transfers the GTP-PDU to a GTP connection established with the gateway node GGSN which is associated with the GTP connection established with the radio network controller RNC through which the received GTP-PDU has passed.

In step S507, the data relay unit 65 of the gateway node GGSN extracts the data packet from the received GTP-PDU. In step S508, the data relay unit 65 of the gateway node GGSN transfers the extracted data packet to the receiving communication terminal TE through the packet communication network.

INDUSTRIAL APPLICABILITY

According to the present invention, the number of RLC connections to be established can be reduced, and loads related to path changes in handovers can be reduced.

The invention claimed is:

1. A packet communication method comprising the steps of:
establishing a single radio layer 2 connection based on a radio layer 2 protocol, between a mobile station and a controller device, the single radio layer 2 connection associated with multiple GTP (GPRS Tunneling Protocol) based connections;
receiving, at the controller device, data packets in which respective qualities of service are set;
inputting, at the controller device, the data packets to queues corresponding to the respective qualities of service;
determining, at the controller device, a timing for taking out each data packet of the data packets from the queues corresponding to the respective qualities of service, based on the respective qualities of service; and
multiplexing, at the controller device, each data packet of the data packets taken from the queues at the determined timing into a radio layer 2 protocol data unit of a fixed length which is transmitted and received on the single radio layer 2 connection associated with multiple GTP based connections.

2. A controller device comprising:
a radio layer 2 connection establishing unit configured to establish, with a mobile station, a single radio layer 2 connection based on a radio layer 2 protocol, the single radio layer 2 connection associated with multiple GTP (GPRS Tunneling Protocol) based connections;
a reception unit configured to receive a plurality of data packets in which respective qualities of service are set;
an input unit configured to input the plurality of data packets to queues corresponding to the respective qualities of service;
a transmission timing determining unit configured to determine a timing for taking out each data packet of the plurality of data packets from the queues corresponding to the respective qualities of service, based on the respective qualities of service; and
a multiplexing unit configured to multiplex each data packet of the plurality of data packet packets taken from the queues at the determined timing into a radio layer 2 protocol data unit of a fixed length which is transmitted and received on the single radio layer 2 connection associated with multiple GTP based connections.

3. The controller device as set forth in claim 2 further comprising,
a transmitting unit configured to transmit, by a transport technology, the radio layer 2 protocol data unit into which each data packet of the plurality of data packets is multiplexed.

4. A mobile station comprising:
a radio layer 2 connection establishing unit configured to establish, with a controller device, a single radio layer 2 connection based on a radio layer 2 protocol, the single radio layer 2 connection associated with multiple GTP (GPRS Tunneling Protocol) based connections;
an input unit configured to input a plurality of data packets, in which respective qualities of service are set, to queues corresponding to the respective qualities of service;
a transmission timing determining unit configured to determine a timing for taking out each data packet of the plurality of data packets from the queues corresponding to the respective qualities of service, based on the respective qualities of service; and
a multiplexing unit configured to multiplex, each data packet of the plurality of data packets taken from the queues at the determined timing into a radio layer 2 protocol data unit of a fixed length which is transmitted and received on the single radio layer 2 connection associated with multiple GTP based connections.

5. The mobile station as set forth in claim 4 further comprising,
a transmitting unit configured to transmit, by a radio access technology, the radio layer 2 protocol data unit into which each data packet of the plurality of data packet packets is multiplexed.

6. A packet communication method comprising:
establishing, at a mobile station, a single radio layer 2 connection based on a radio layer 2 protocol;
establishing a plurality of GTP (GPRS Tunneling Protocol) based tunneling connections for respective qualities of service, between a first controller device and a second controller device;
receiving, at the first controller device, a plurality of data packets in which the respective qualities of service are set and which are transmitted from the mobile station, through the single radio layer 2 connection or a single GTP based tunneling connection; determining, at the first controller device, a GTP based tunneling connection associated with a terminal address of the mobile station and a quality of service which are included in each data packet of the received plurality of data packets, among a plurality of GTP based tunneling connections for respective qualities of service; and
relaying, at the first controller device, each data packet of the plurality of data packets to the second controller device through the determined GTP based tunneling connection.

7. The packet communication method as set forth in claim 6 further comprising the steps of:
transmitting, at the mobile station, a communication start request;
transmitting, at the first controller device, a GTP (GPRS Tunneling Protocol) based tunneling connection establishment request to the second controller device in accordance with the communication start request;
establishing, at the second controller device, a GTP based tunneling connection with the first controller device in accordance with the GTP based tunneling connection establishment request, and associating the established GTP based tunneling connection with the terminal address of the mobile station; and
communicating the associated terminal address to the mobile station.

8. A controller device comprising:
a tunneling connection establishing unit configured to establish a plurality of GTP (GPRS Tunneling Protocol) based tunneling connections for respective qualities of service with a certain controller device;
a data packet receiving unit configured to receive a plurality of data packets in which the respective qualities of service are set and which are transmitted from a mobile station, through a single radio layer 2 connection or a single GTP based tunneling connection; and a relay unit configured to determine a GTP based tunneling connection associated with a terminal address of the mobile station and a quality of service which are included in each data packet of the received plurality of data packets, among a plurality of GTP based tunneling connections for respective qualities of service, and to relay each data packet of the plurality of data packets to the second controller device through the determined GTP based tunneling connection.

* * * * *